United States Patent
Bianchini

(10) Patent No.: US 11,054,084 B1
(45) Date of Patent: Jul. 6, 2021

(54) METHOD AND APPARATUS FOR CREATING A PRE-FABRICATED KIT FOR ASSEMBLING AND SUSPENDING A CUSTOM DESIGN FRAME FOR SUPPORTING A PACKAGE IN AN ELEVATED POSITION

(71) Applicant: Jay G. Bianchini, Covington, LA (US)

(72) Inventor: Jay G. Bianchini, Covington, LA (US)

( * ) Notice: Subject to any disclaimer, the term of this patent is extended or adjusted under 35 U.S.C. 154(b) by 101 days.

(21) Appl. No.: 16/278,276

(22) Filed: Feb. 18, 2019

Related U.S. Application Data

(63) Continuation of application No. 15/165,320, filed on May 26, 2016, now Pat. No. 10,208,892.

(60) Provisional application No. 62/241,990, filed on Oct. 15, 2015.

(51) Int. Cl.
  *F16M 13/02* (2006.01)
  *G05B 19/4097* (2006.01)

(52) U.S. Cl.
  CPC ....... *F16M 13/027* (2013.01); *G05B 19/4097* (2013.01); *G05B 2219/32099* (2013.01)

(58) Field of Classification Search
  CPC ... F16M 13/027; F16L 3/221; G05B 19/4097; G05B 2219/32099; E04B 1/5818; E04C 3/07; E04C 2003/0421; E04C 2003/0434; E04C 2003/0473
  See application file for complete search history.

(56) References Cited

U.S. PATENT DOCUMENTS

| | | | |
|---|---|---|---|
| 1,850,118 A * | 3/1932 | Meyers | E04B 1/24 52/223.6 |
| 3,304,108 A | 2/1967 | Hamilton | |
| 3,625,372 A * | 12/1971 | MacKenzie | A47B 57/408 211/191 |
| 3,786,612 A | 1/1974 | Baker | |
| 4,725,083 A | 2/1988 | Schauer | |
| 4,900,108 A | 2/1990 | Tischer | |
| 5,005,848 A | 4/1991 | Cornell | |
| 5,924,259 A | 7/1999 | Marousek | |
| 6,059,322 A | 5/2000 | Nagai et al. | |
| 6,523,322 B1 * | 2/2003 | Michalski | E04B 1/24 52/236.7 |
| 6,926,459 B1 | 8/2005 | Oakley | |
| 7,703,244 B2 | 4/2010 | Suzuki et al. | |
| 8,863,438 B1 * | 10/2014 | Seitz | E06B 1/522 49/197 |
| 10,208,892 B1 | 2/2019 | Bianchini | |
| 2010/0126103 A1 * | 5/2010 | diGirolamo | E04B 2/58 52/655.1 |
| 2011/0215218 A1 | 9/2011 | Jarrett | |
| 2016/0322703 A1 | 11/2016 | Jesme et al. | |

OTHER PUBLICATIONS

Hilti Inc. "Summary of test construction of Hilti Racks" Jul. 27, 2011.

* cited by examiner

*Primary Examiner* — Ko H Chan
(74) *Attorney, Agent, or Firm* — Roy Kiesel Ford Doody & North, APLC; Brett A. North

(57) ABSTRACT

One embodiment provides a pre fabricated kit for assembling a supporting framework comprising a plurality of customized beams or supports with a connection openings/hole patterns selected from a set of connection hole patterns and using a plurality of generic connectors which fit on the interior of the customized beams or supports.

11 Claims, 12 Drawing Sheets

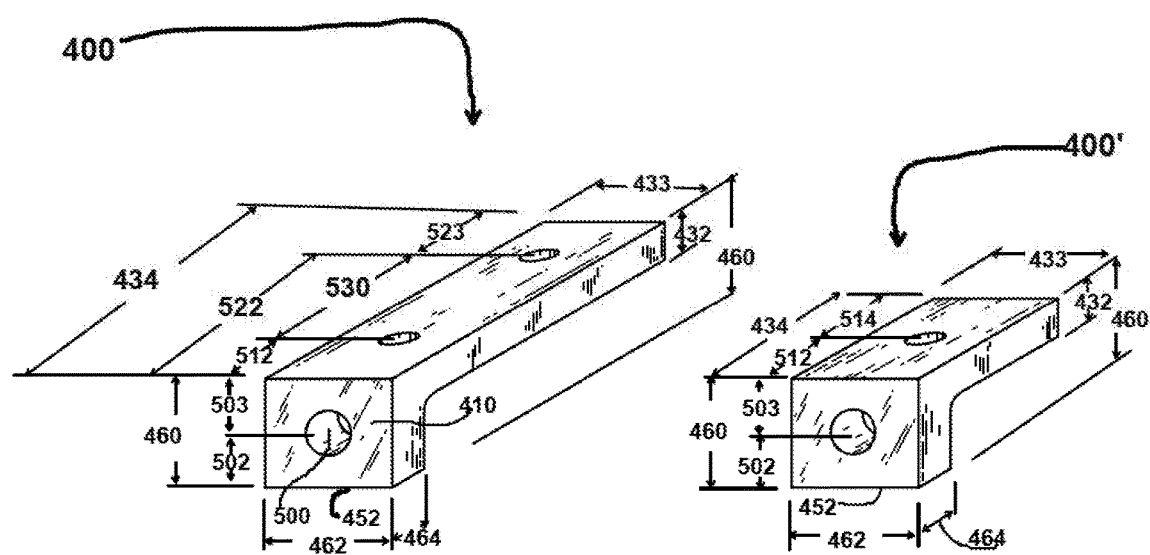
FIG. 2  FIG. 3
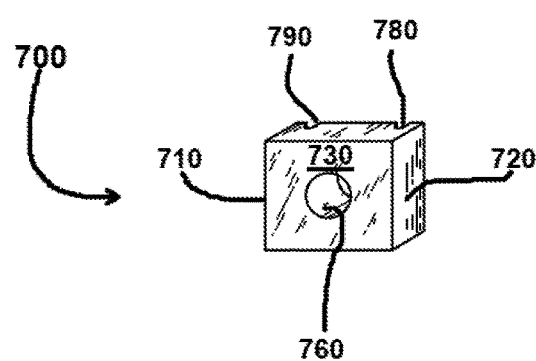 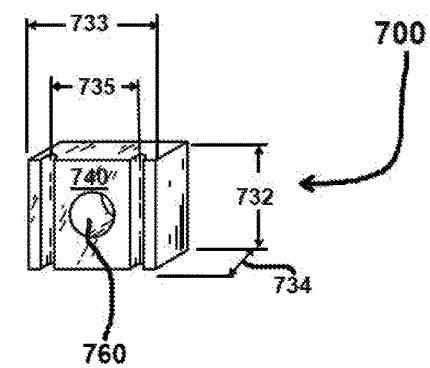
FIG. 4  FIG. 5

METHOD AND APPARATUS FOR CREATING A PRE-FABRICATED KIT FOR ASSEMBLING AND SUSPENDING A CUSTOM DESIGN FRAME FOR SUPPORTING A PACKAGE IN AN ELEVATED POSITION

CROSS-REFERENCE TO RELATED APPLICATIONS

This is a continuation of U.S. patent application Ser. No. 15/165,320, filed May 26, 2016 (issuing as U.S. Pat. No. 10,208,892 on Feb. 19, 2019) which was a non-provisional of U.S. provisional patent application Ser. No. 62/241,990, file Oct. 15, 2015, which applications are incorporated herein by reference and priority of/to which application is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

In supporting packages at elevated positions with structural support systems vertical locations such as ceilings or roofing frameworks, difficulties exist because of the irregular locations of possible tensile support connections and different loads to be supported such as weight loads and loads of varying external dimensions.

Additionally, difficulties in existing supporting frame structures exist because these require multiple connecting pieces of multiple different shapes and sizes when assembling a frame for a modular system. These connector pieces have to be different shapes because they are mounted externally to the individual supporting beams or struts to be used in assembling a supporting frame.

It would be advantageous to have a system which avoids the disadvantages of the prior art.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The apparatus of the present invention solves the problems confronted in the art in a simple and straightforward manner.

One embodiment provides a method and apparatus for suspending air conditioning duct works from a support structure comprising unistrut type support beams which apparatus includes a plurality of support brackets arranged and configured for being slidably interlockable with the interior of the unistrut beam members.

One embodiment generally relates to frames for supporting packages in elevated positions, and more particularly to a method and apparatus for creating a pre-fabricated kit for assembling a supporting a frame comprising multiple unistrut support beams of different lengths and connectable support brackets.

In various embodiments are provide a new modular system have three components:

(1) a universal connector piece (FIGS. 2 and 3);

(2) a washer (FIGS. 4 and 5) which fit within the inner profile of a generic beam or strut; and (3) a plurality of a cut to length beams or strut (FIG. 1) where each beam or strut is cut to length and punched as required for assembly and for supporting a package of particular dimensions and loading.

In various embodiments is provided a generic or universal connecting support bracket which is mounted interiorly to individual supporting beams or struts which will be used in connecting the end of one beam or strut member to a flange or web of another beam or strut member. In various embodiments this connection causes the two beam or strut members to be perpendicular to one another.

In various embodiments is provided a generic or universal connecting washer which is slidably mounted interiorly to individual supporting beams or struts which will be used in connecting the end of one beam or strut member to the open end of another beam or strut member (i.e., the area between the two flange members of another beam or strut member). In various embodiments this connection causes the two beam or strut members to be perpendicular to one another. In various embodiments this generic washer fits the inner profile of the beam or strut member to which the other end of the beam or strut member is to be connected.

In various embodiments is provided a plurality of customized to length beam or strut members having connecting opening patterns selected from a set of possible patterns at each connection joint location for each beam or strut.

In various embodiments are provided a pre fabricated kit for assembly a customized supporting structure with the kit including a set of customized manufactured struts which are cut to length with connection hole openings in the correct pattern at each connection joint location and where said connection hole opening patterns are selected from a set of possible opening patterns.

In various embodiments the plurality of customized manufactured struts only have connection hole openings in the locations of connection joints for the particular supporting frame to be assembled from the pre fabricated kit. FIGS. 7 through 10 provide examples of a possible sets of connection hole opening patterns.

In various embodiments the at a connection joint on a particular beam or strut, the quantity, location, and size of the connection holes comprise the hole pattern for that connection joint.

In various embodiments the method and apparatus can select from a set of predefined connection opening/hole patterns to be made on each beam or strut in the pre fabricated kit. In various embodiments, depending on the type of supporting frame to be assembled from the pre fabricated kit to support a package in an elevated position, it is envisions that four connection opening/hole patters will satisfy most connection possibilities for the connection joints in the frame to be assembled from the pre-fabricated kit.

In various embodiments at least the following hole patterns are envisioned:

(A) two connection openings/holes on the web of beam strut at specified longitudinal locations along the beam or strut;

(B) one connection opening/hole on the web and connection opening/hole on each flange of the beam or strut at specified longitudinal locations along the beam or strut;

(C) one connection opening/hole on each flange of the beam or strut at specified longitudinal locations along the beam or strut; and (D) one connection opening/hole on the web of the beam or strut at specified longitudinal locations along the beam or strut.

In various embodiments (i) the quantity of customized beams or struts in a set of struts included in a pre-fabricated kit, and (ii) the lengths and connection opening/hole patterns in each customized beam or strut in the set of beams or struts will be determined on a customized supporting frame-by-frame basis for any frame structure to be assembled from a pre fabricated kit made using various embodiments of the method and apparatus.

In various embodiments, before two beam or strut pieces are tightened for a connection, the two beam or strut pieces are adjustable relative to each other along the longitudinal axis of one of the two beam or strut pieces. In various embodiments, the rotational adjustability is about the longitudinal axis of the beam or strut piece that has its open end face covered by the second beam or strut (see FIG. 11).

In various embodiments the method and apparatus can be computer automated. In these embodiments, in creating a pre fabricated kit including a plurality of customized beams or struts for assembling a custom supporting structure, the quantity of beams or struts, longitudinal lengths of each beam or strut, number and type of connection joints on each beam or strut, location and number of connection openings/holes and their patterns can be determined by the method and apparatus.

In various embodiments a set of customized beams or struts can be cut and/or punched on a specially designed CNC machine that has cam file technology. In various embodiments Cam file is used to send an electronic file (e.g., a .dxf file) having each piece's requirements (e.g., quantity and length of each beam or strut in a set of beams or struts, quantity of holes in each beam or strut in a set of beams or struts, location of each hole in each beam or strut in a set of beams or struts, and size of particular holes each beam or strut in a set of beams or struts), from a customer's P/C to the PIC that communicates with the CNC machine. Once the file is received, the file can be converted to a ".dec file" and is sent to the controller on the Cut/Punch machine.

Various embodiments provide the advantage of using universal connector simplifying the process of modular assembly and resulting in increased productivity and decreased labor costs. Various embodiments reduce material costs due to the decreased number of parts required per connection. Additionally, using cut-to-length beams or struts with pre-punched holes in the patterns required to make each connection at a connection joint reduces the time spent reviewing drawings during assembly of the customized frame.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 2 is a perspective view of one embodiment of a generic detachably connectable support bracket which can be used in the various embodiments (having two threaded openings).

FIG. 3 is a perspective view of one embodiment of a generic detachably connectable support bracket which can be used in the various embodiments (having one threaded opening and being shorter than the bracket shown in FIG. 2).

FIGS. 4 and 5 are top and bottom perspective views of a generic washer having two slots.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
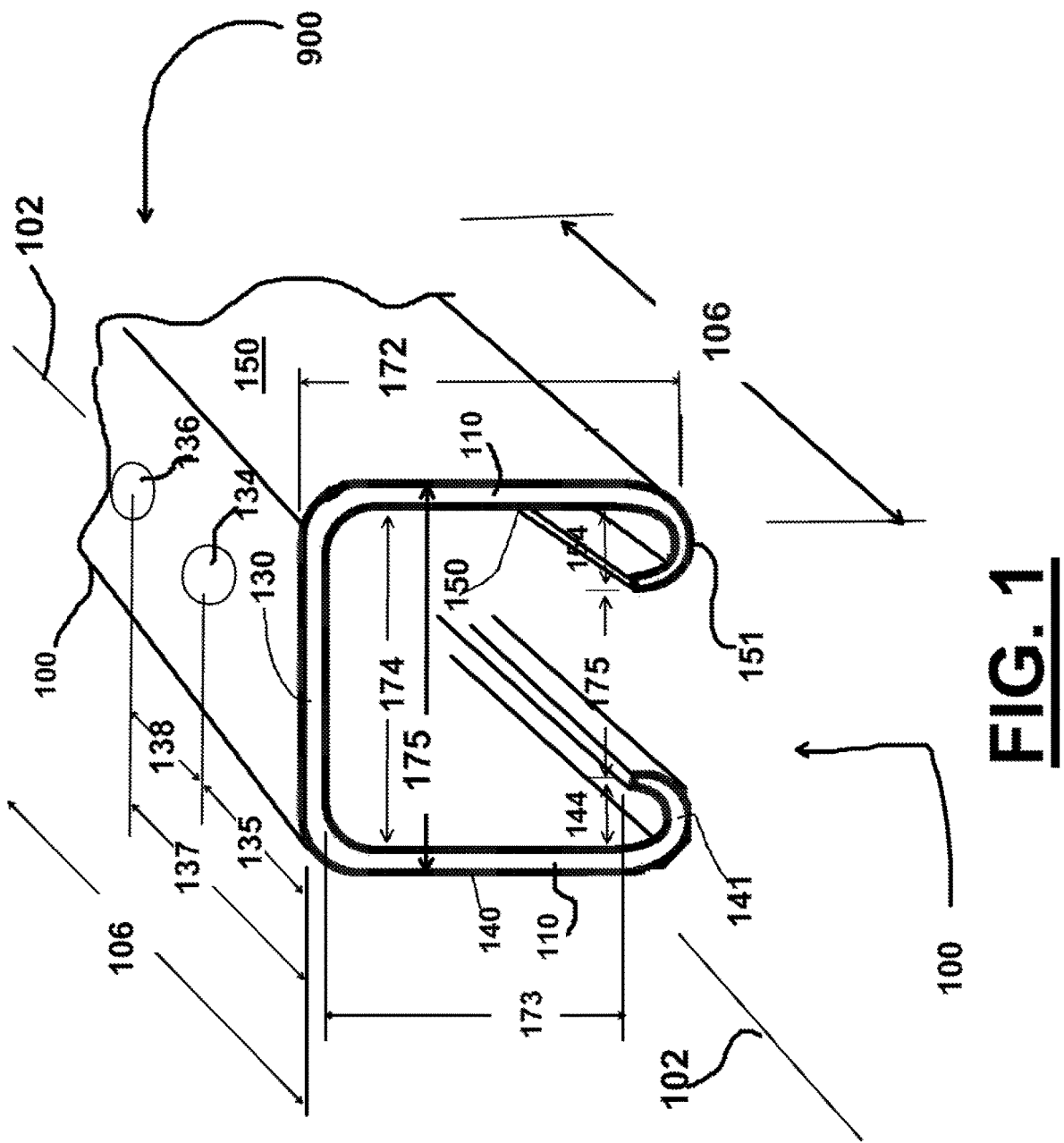
FIG. 1 is a perspective view of the construction of a beam or strut which can be made to a desired longitudinal length and included in a custom designed pre fabricated kit having a plurality of beams or struts for assembling a custom designed frame for supporting a structure.

FIG. 1 is a perspective view of the construction of a beam of strut 100 that can be used in various embodiments. Beam or strut 100 is a C-flange type structural unit and includes web 100 along with first 140 and second 150 flanges. Beam or strut 100 can have a length 106 based on required lengths.

Between first 140 and second 150 flanges is interior 170, which can have a height 173 and a width 174. A cross section of beam or strut can have a height 172 and width 178. Opposite of web 130 can be an open area allowing access to interior 170.

First flange 140 can include a socket 141 having a width 144. Second flange 150 can include a socket 151 having a width 154. An open space 178 between socket 141 and 151 allows access to interior 170. and its dimension is equal to inter As will be described below beam or strut 100 can be connected to other beams or struts 100',100', etc. in various orientations. These orientations are generally where the connecting beams or struts generally perpendicular to beam or strut 100, and include connections on web 130, first flange 140, second flange 150, and/or via opening 178. In some embodiments a generally parallel connections can be made where beam or strut 100, after connection, is generally parallel to the connected other beam or strut (e.g., 100').

FIG. 2 is a perspective view of one embodiment of a connecting bracket 400 which can be used with beam or strut 100. Support bracket 400 includes body 404 and connecting base 406 which is located as first end 410 of body. Support bracket has a height 460, width 462, and length 434. Connecting base 406 can be generally perpendicular to body 404.

Body 404 has a height 432, width 433, and length 434. Body 404 can include second 510 and third 520 openings which may be threaded. Preferably, second 510 and third 520 openings are located in the longitudinal center of body 404 (i.e., in the center of dimension 433). Second opening 510 is spaced from first end 410 by dimension 512. Third opening 520 is spaced from second opening 510 by dimension 530, from face 450 by dimension 522, and from second end 420 by dimension 523. As will be described below in relation to FIG. 6, second 510 and third 520 openings can be used to attach support bracket 400 to the web 130 of supporting beam or strut 106 having matching connection openings.

Connecting base 406 has a height 460, width 462, and depth 464. Connecting base 406 can include opening 500 which can be threaded. Preferably, opening 500 is in the vertical center of connecting base 406 (i.e., in the center of horizontal dimension 462). Also preferably, opening 500 is horizontally spaced in connecting base 406 (dimension 502 and dimension 503) such that when support bracket 400 is inserted into a supporting beam or strut 106, opening is in the horizontal center of the support beam or strut 106 (i.e., in the middle of dimension 172 of FIG. 1). In this manner opening 500 of support bracket 400 can be used to connect the particular support beam or strut 106 having support bracket 400 in the longitudinal centerline 102 of said support beam or strut 106.

FIG. 3 is a perspective view of an alternative support bracket 400'. Alternative support bracket 400' can be substantially similar in construction to support bracket 400, with the exception that that dimension 434 is shorter for support bracket 400' and support bracket 400' includes a single opening (second opening 510).

FIGS. 4 and 5 shows front and rear views of washer 700. Washer 700 can have substantially flat top 730 and bottom 740 portions with first 710 and second 720 ends. Opening 760 can be included in washer 700 which is preferably located at the center of top 730. Bottom portion can include first 780 and second 790 grooves or slot having a spacing 735.

Figure 6:
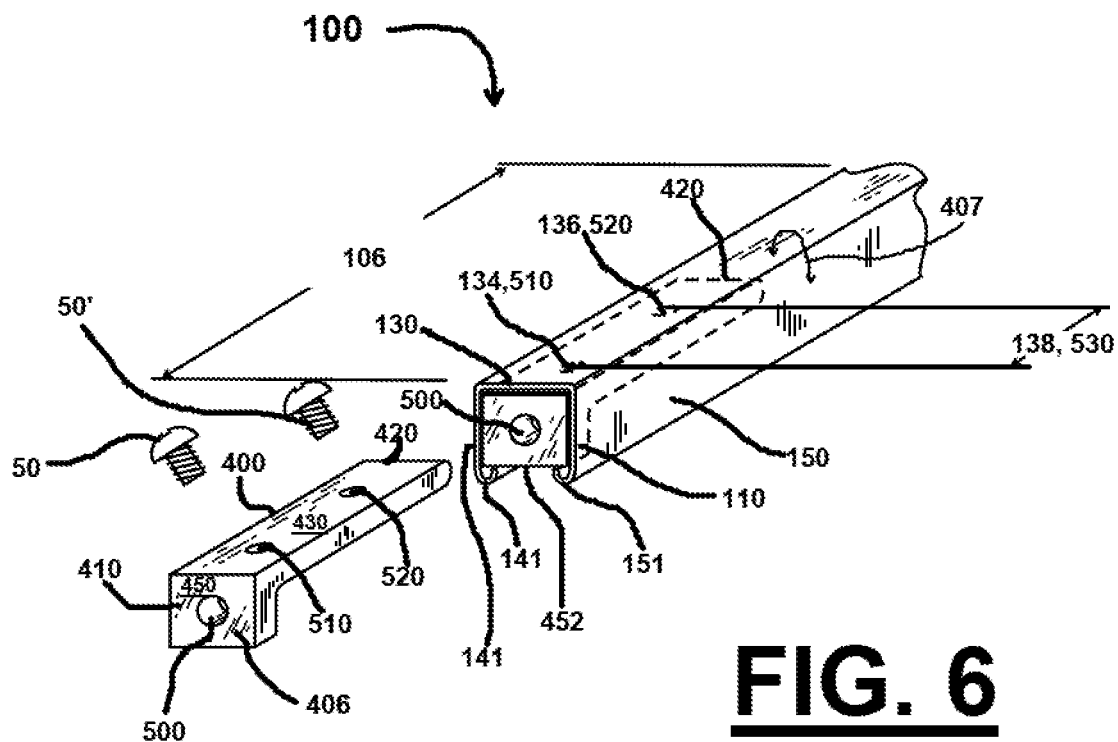
FIG. 6 shows the support bracket of FIG. 2 being connected to a beam or strut of FIG. 1 having a specified length.

FIG. 6 schematically illustrates the connection of a support bracket 400 to a selected supporting beam or strut 100. Supporting beam or strut includes connection openings 134 and 136. Second end 420 of support bracket 400 can be slid into interior 176 of beam or strut 106 until face 450 is flush with first end 110 of beam or strut 106. Second 510 and third 520 openings respectively align with connection openings 134 and 136. At this point fasteners 50 can be inserted into connection openings 134 and 136 and threadably connected to second 510 and third 520 openings—which themselves are threaded. After connection of support bracket 400 to beam or strut 100, opening 500 (which itself is threaded) can be used to connect this beam or strut 100 to other beams or struts as will be described below.

In various embodiments the height 460 and width 462 of connecting base 406 is only slightly smaller than the height 173 and width 174 of interior 170 of connecting beam or strut 100. Said slightly smaller dimensions allow the depth 464 of connecting base 406 to cause top 430 of body 404 to remain both substantially parallel to and immediately adjacent to web 103 of support beam or strut 100 after insertion of support bracket 400 into support beam or strut 100 which can make easier screwing in threaded fasteners 50 into connection openings 510 and 520. This can also avoid a user having to push up on the lower surface of body 404 during the process of screwing in threaded fasteners 50. In various embodiments, due to the interaction of connecting base 404 with the interior 170 of beam or strut 100, body 404 remains substantially parallel to web 130 having an angle 407 (FIG. 6). In various embodiments angle 407 can be less than 10 degrees. In various embodiments angle 407 less than 10, 9, 8, 6, 5, 4, 3, 2, 1, and ½ degree angle exists. In various embodiments the relative angle 407 between body 404 and web 130 before support bracket is screwed to web 130 can fall within a range of between any two of the above specified maximum degree angles (e.g., between ½ and 4 degrees, or 2 and 5 degrees).

Figure 7:
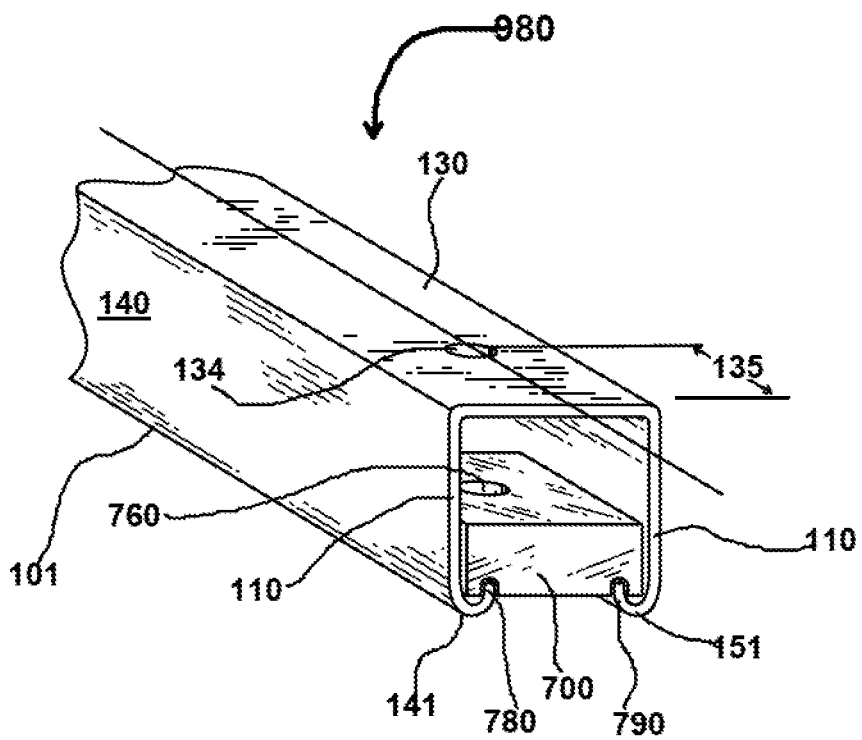
FIG. 7 shows the washer of FIGS. 4 and 5 inserted in a beam or strut of FIG. 1 having a specified length.

FIG. 7 provides an example of washer 700 being placed in interior 170 of a beam or strut 100 which support washer 700 can later be used to connect another beam or strut 100' to the beam or strut 100 having support washer 700 located therein. First 780 and second 790 recessed areas of washer 700 can respective seat over sockets 141 and 151. A threaded fastener 50 can thereafter be placed in opening 760 (such as through opening 134) to connect another beam or strut 100' (such as by screwing into first opening 500 of a support bracket 400 connected to the another beam or strut 100'). Opening 134 on web 130 of the another beam or support 100' can be used to insert a tool and connect washer 700 to support bracket 400 by tightened which is inserted through opening 760 and threaded into first opening 500 of support bracket 400, which support bracket is connected to the another beam or support 100'. As screw 50 is tightened the another support or beam 100' (along with the face 450 of support bracket 400) comes closer and causes connection between beam or strut 100 (having washer 700) and the another beam or strut 100' having support bracket 400. This connection is caused by screw 50 squeezing together washer 700, sockets 141 and 151, and support bracket 500. Opening 134 is can be placed in web 130 of beam or strut 100 at the longitudinal location (e.g., dimension 135) of where the connection is to be made between beam or strut 100 and the another beam or strut 100'.

Connection Hole Patterns

FIGS. 7, 8, 9, and 10 show various connection opening pattern for beam or strut 100.

Figure 8:
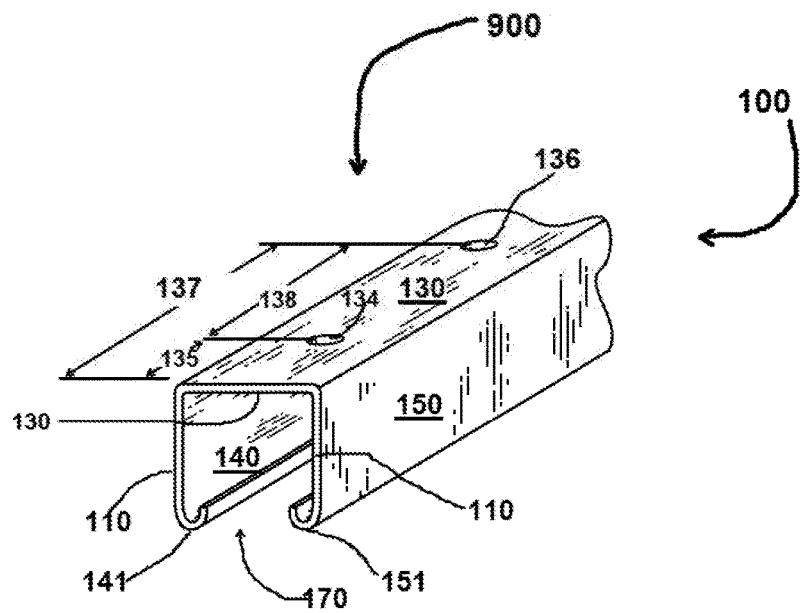
FIG. 8 shows the beam or strut of FIG. 1 having a specified length and having a connecting opening pattern at one end to connect the support bracket of FIG. 2.

FIG. 8 shows a basic two hole opening pattern 900 showing first 134 and second 136 openings located on web 130 of beam or strut 100 respectively at distances 136 and 137 from first end 110 of beam or strut 100. This opening pattern 900 can be used for connecting support bracket 400 to beam or strut 100 as described in connection with FIG. 6 creating a threaded female receiving opening 500 at connector base 406 of now connected support bracket 400.

Figure 9:
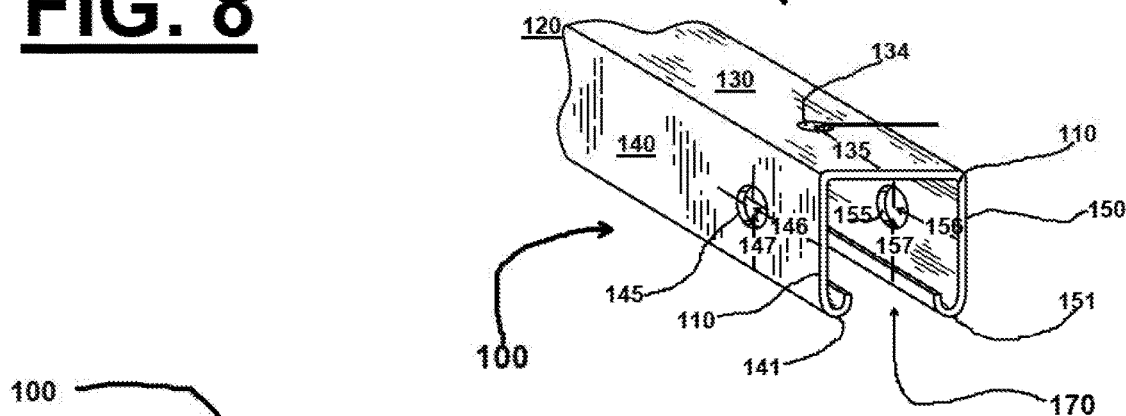
FIG. 9 shows the beam or strut of FIG. 1 having a specified length and having a connecting opening pattern at one end to connect to allow the connection of up to two other beams or supports on any two of the four sides of the beam or strut, and for side connections having the connection openings on the sides opposing the connection point being usable to insert a tightening tool such as a screwdriver.

FIG. 9 shows a basic three hole opening pattern 940 with: (a) first opening 134 located on web 130 at distance 136 from first end 110 of beam or strut 100; (b) first opening 146 located on c-flange 140 at distance 146 from first end 110 of beam or strut 100, and height 147 above the bottom of beam or strut 100; and (c) first opening 156 located on c-flange 150 at distance 156 from first end 110 of beam or strut 100, and height 157 above the bottom of beam or strut 100. In preferred embodiments heights 147 and 157 can be equal, and distances 146 and 156 are equal. In various embodiments first opening 134 is located in the center of web 130 cross section, and the distance 135 is equal to distance 146 and/or distance 156. This opening pattern 940 is very flexible and can be used for the following types of three beam or strut connections: (1) perpendicular connection of a second beam or strut 100' to second flange 150 at opening 155 (see FIG. 11) where a screw driver 41 placed through opening 145 can be used to tighten threaded fastener 50 through opening 155 and into threaded opening 500' of support bracket 400'(see FIG. 12); (2) perpendicular connection of a second beam or strut 100' to first flange 140 at opening 145 (see FIG. 11 but beam 100' being connected to first flange 140 instead of second flange 150) where a screw driver 41 placed through opening 155 can be used to tighten threaded fastener 50 through opening 145 and into threaded opening 500' of support bracket 400'(see FIG. 12); and (3) perpendicular connection of a third beam or strut 100" to web 130 at opening 134 (see FIG. 11) where a screw driver placed through gap 175 and into interior 170 can be used to tighten threaded fastener 50 through opening 134 and into threaded opening 500" of support bracket 400" (see FIG. 12).

Figure 11:
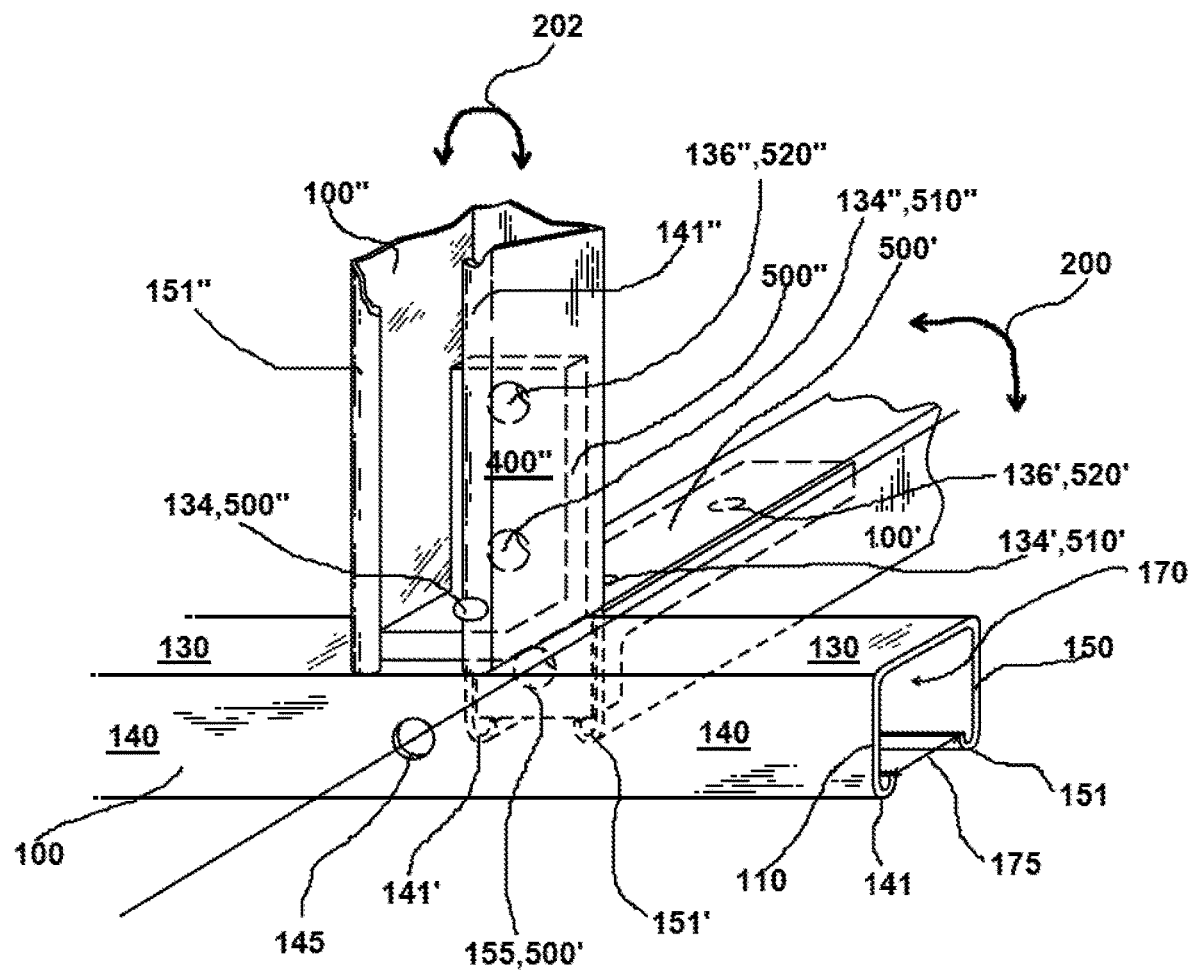
FIG. 11 is a perspective view of an example connection joint with two beams or struts connected to a supporting beam or strut, on the web and side of the supporting beam or strut.
Figure 12:
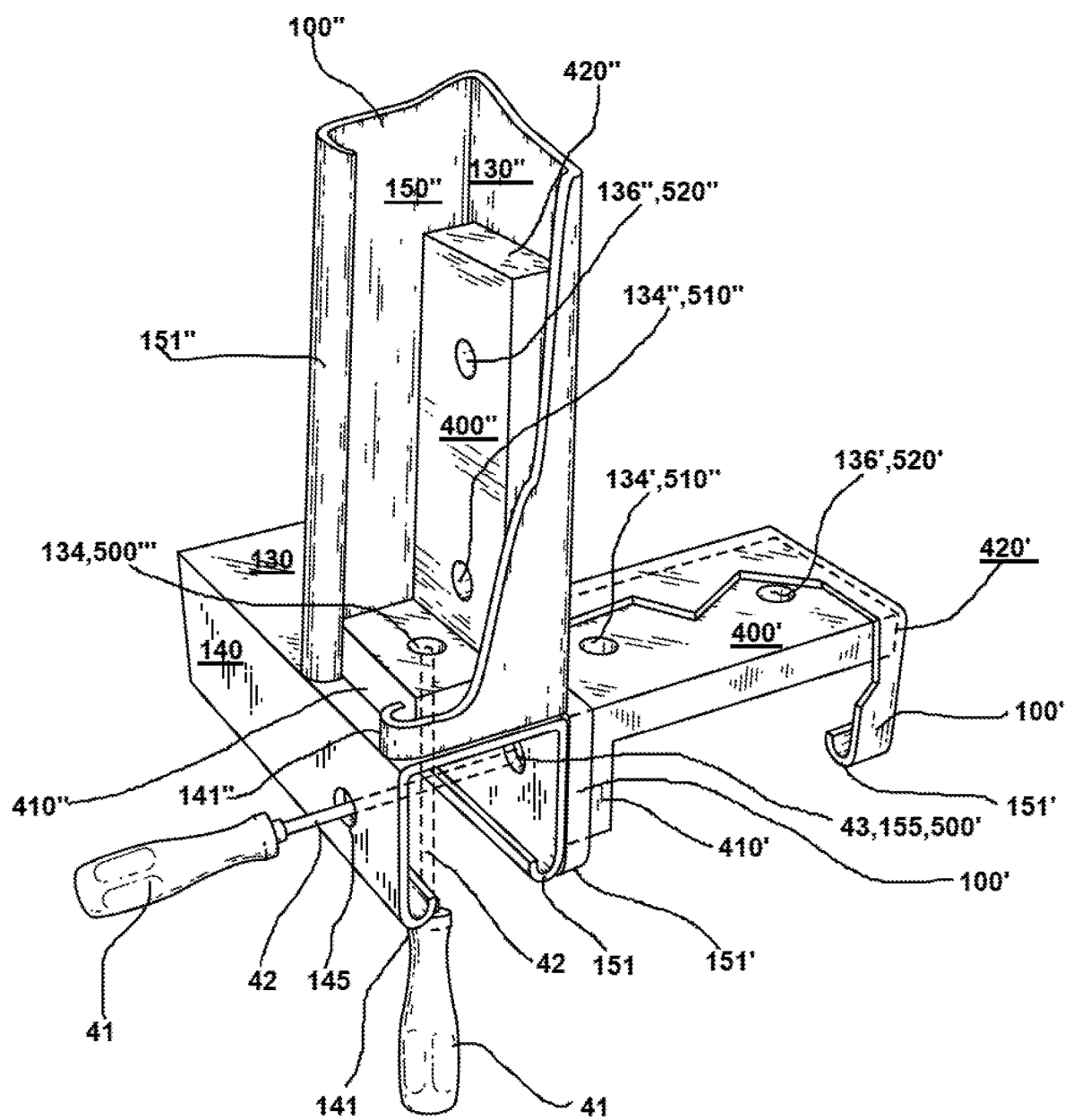
FIG. 12 is a perspective view of the example connection joint of FIG. 11 schematically showing a screw driver being used to connect the two beams or struts to the supporting beam or strut.

Arrows 200 and 202 in FIG. 11 schematically indicate that, although remaining perpendicular to beam or strut 100 both beams or struts 100' and 100" can be rotated respective to their connections to select possible different relative orientations. For example beam or strut 100' can be rotated 180 degrees to the orientation shown in FIG. 11 so that its web 130' is pointing downwardly compared to the web 130 of beam or strut 100. As another example beam or strut 100' can be rotated 90 degrees to the orientation shown in FIG. 11 so that its web 130' is pointing in the same direction as first end 110 of beam or strut 100. Similarly, beam or strut 100" can be rotated 180 degrees to the orientation shown in FIG. 11 so that its web 130" is pointing towards flange 140 beam or strut 100, or rotated 90 degrees so that its web 130" is pointed towards (or away from) first end 110 of beam or strut 100.

Figure 10:
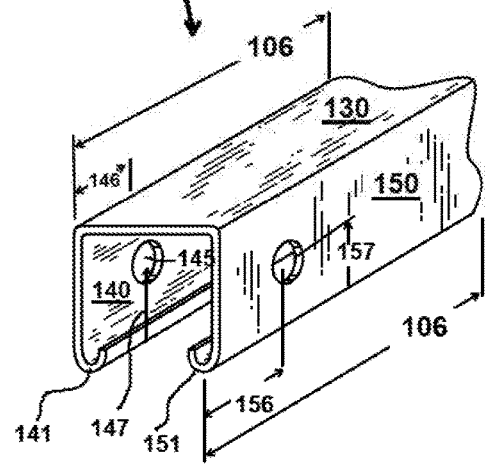
FIG. 10 shows the beam or strut of FIG. 1 having a specified length and having a connecting opening pattern at one end to connect to allow the connection of one beam or support on any two of the two side flanges, and with the connection opening on the side opposing the connection point being usable to insert a tightening tool such as a screwdriver.

FIG. 10 shows a basic two hole opening pattern 960 with: (a) a first opening 146 located on c-flange 140 at distance 146 from first end 110 of beam or strut 100, and height 147 above the bottom of beam or strut 100 and (b) a first opening 156 located on c-flange 150 at distance 156 from first end 110 of beam or strut 100, and height 157 above the bottom of beam or strut 100. In preferred embodiments heights 147 and 157 can be equal, and distances 146 and 156 are equal. This opening pattern 960 can be used for the following types of two beam or strut connections: (1) perpendicular connection of a second beam or strut 100' to second flange 150 at opening 155 (see FIG. 11) where a screw driver 41 placed through opening 145 can be used to tighten threaded fastener 50 through opening 155 and into threaded opening 500' of support bracket 400'(see FIG. 12) or (2) perpendicular connection of a second beam or strut 100' to first flange 140 at opening 145 (see FIG. 11 but beam 100' being connected to first flange 140 instead of second flange 150) where a screw driver placed through opening 155 can be used to tighten threaded fastener 50 through opening 145 and into threaded opening 500' of support bracket 400'(see FIG. 12).

Arrows 200 and 202 in FIG. 11 schematically indicate that, although remaining perpendicular to beam or strut 100 both beam or strut 100' can be rotated respective to its connection to select possible different relative orientations. For example beam or strut 100' can be rotated 180 degrees to the orientation shown in FIG. 11 so that its web 130' is pointing downwardly compared to the web 130 of beam or strut 100. As another example beam or strut 100' can be rotated 90 degrees to the orientation shown in FIG. 11 so that its web 130' is pointing in the same direction as first end 110 of beam or strut 100.

FIG. 7 shows a basic singe hole opening pattern 980 with a first opening 134 located on web 130 at distance 135 from first end 110 of beam or strut 100, and preferably in the middle of web 130. This opening pattern 960 can be used for the following types of two beam or strut connections: (1) perpendicular connection of a third beam or strut 100" to washer 700 where a screw driver 41 placed through opening 135, into interior 170 and tightening threaded fastener 50 through opening 760 and into threaded opening 500" of support bracket 400" which is placed under washer 700 (see FIG. 12); or (2) omitting washer 700 with a perpendicular connection of a third beam or strut 100" to web 130 at opening 134 (see FIG. 11) where a screw driver 41 placed through gap 175 and into interior 170 can be used to tighten threaded fastener 50 through opening 134 and into threaded opening 500" of support bracket 400" (see FIG. 12).

Assembled Supporting Structure

Figure 13:
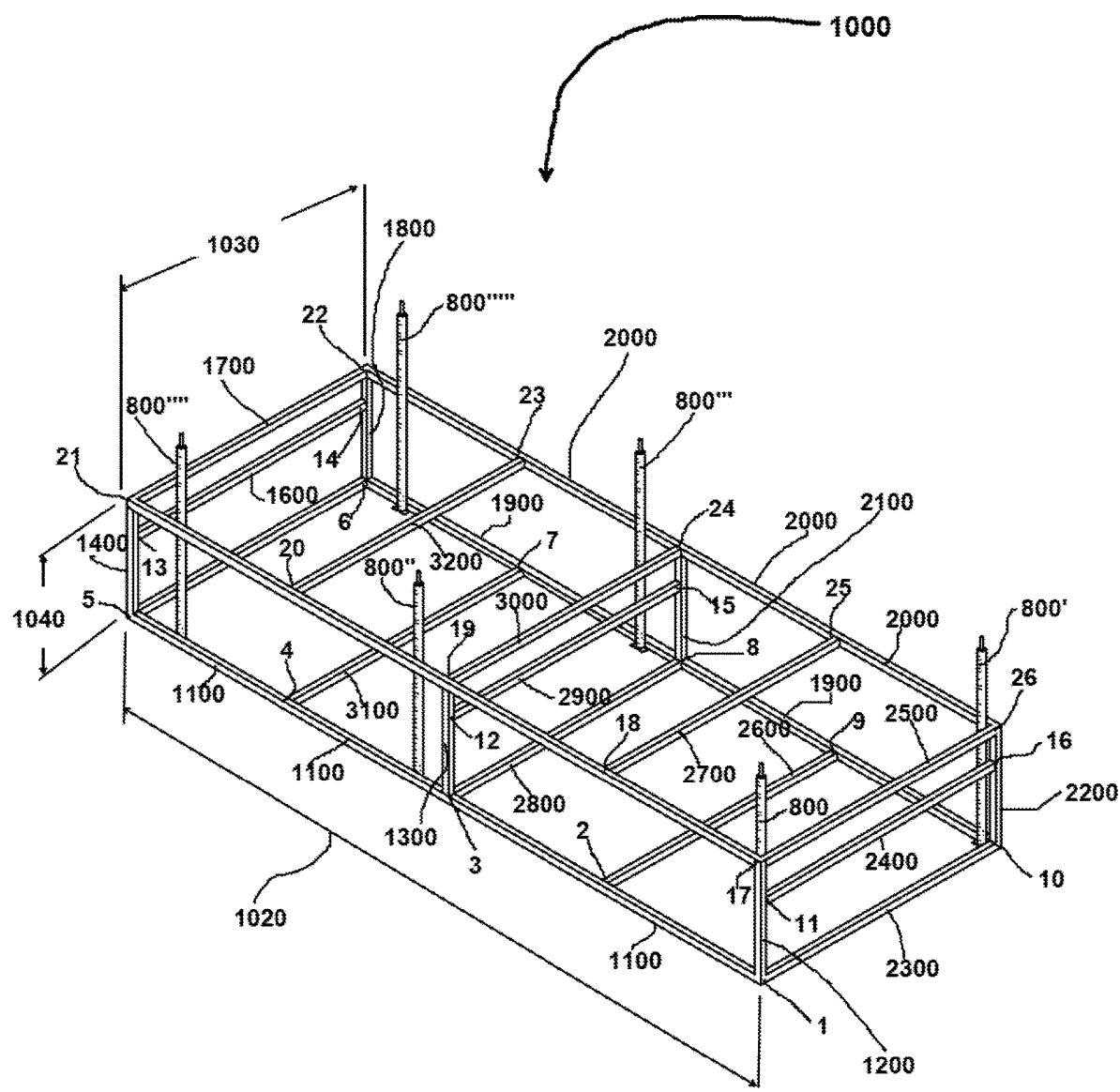
FIG. 13 is a perspective view of a multi level supporting frame assembled from a pre fabricated kit made by the method and apparatus, and which frame can support, in an elevated position, a package (e.g., A/C ductwork).
Figure 14:
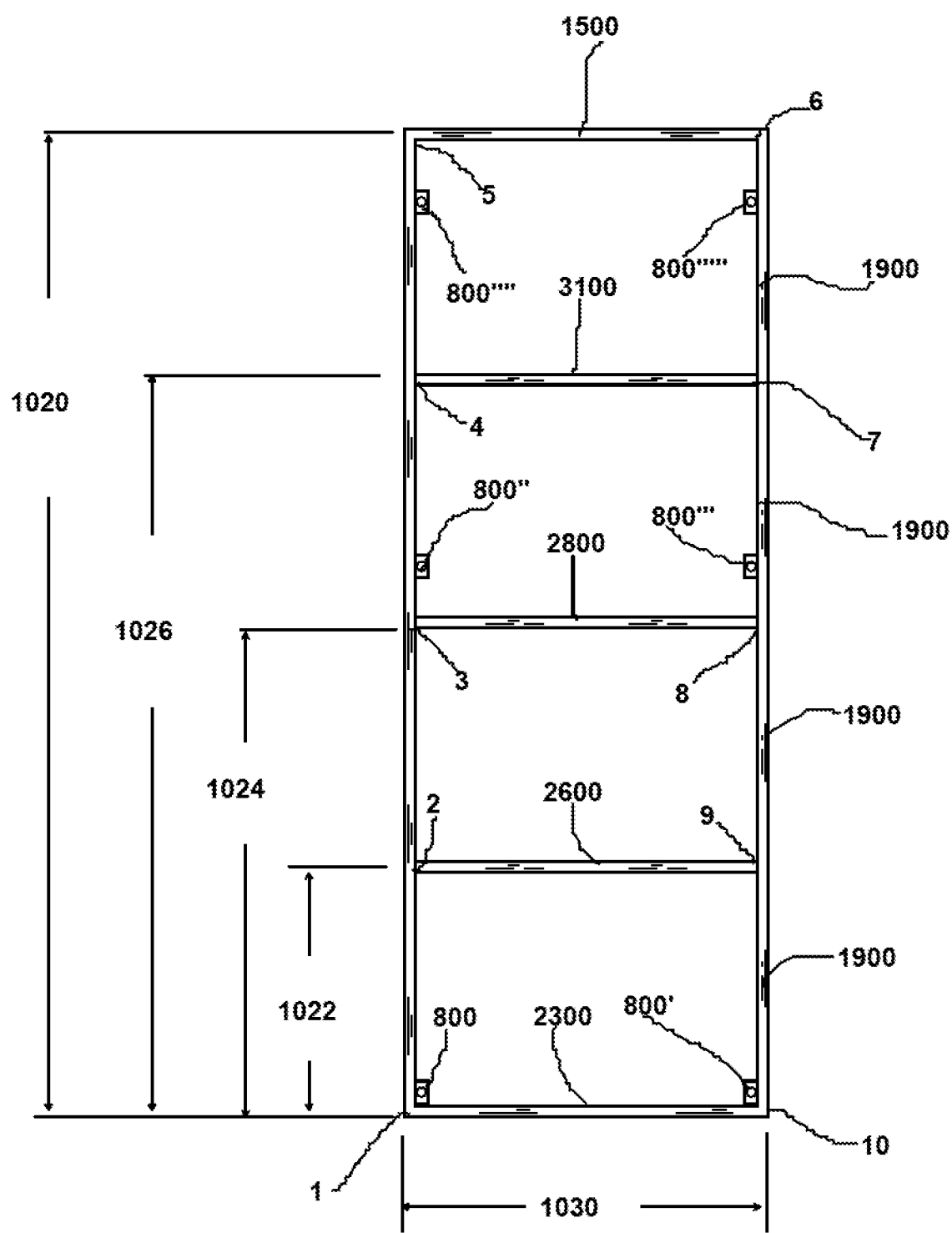
FIG. 14 is a top view of the supporting frame of FIG. 13.
Figure 15:
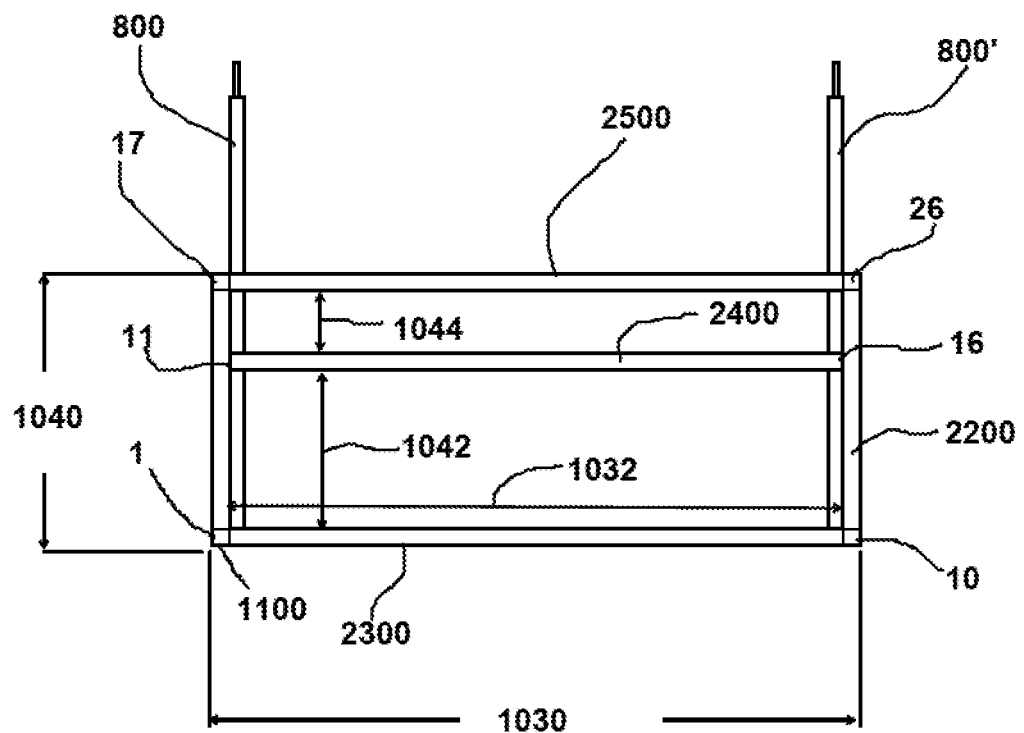
FIG. 15 is a side view of the supporting frame of FIG. 13.

FIG. 13 is a perspective view of a support frame 1000 which supports, in an elevated position, a package 4000 (e.g., A/C ductwork). Support frame 1000 can comprise a plurality of individually cut beams or struts 100, 100', 100" which are assembled in a particular frame geometry. FIG. 14 is a top view of the supporting frame 1000. FIG. 15 is a side view of the supporting frame of FIG. 13.

Support frame 1000 can be supported in an elevated position by a plurality of tensile members 800, 800', 800", etc., which tensile members themselves be supported themselves in a structure such as a ceiling, rafters, beams, etc. Tensile members 800 can be any structural element strong enough to support load or package 4000 at an elevated position in relation to a ground surface. Such members can be arms, rods, chains, cords, wires, etc.

Figure 16:
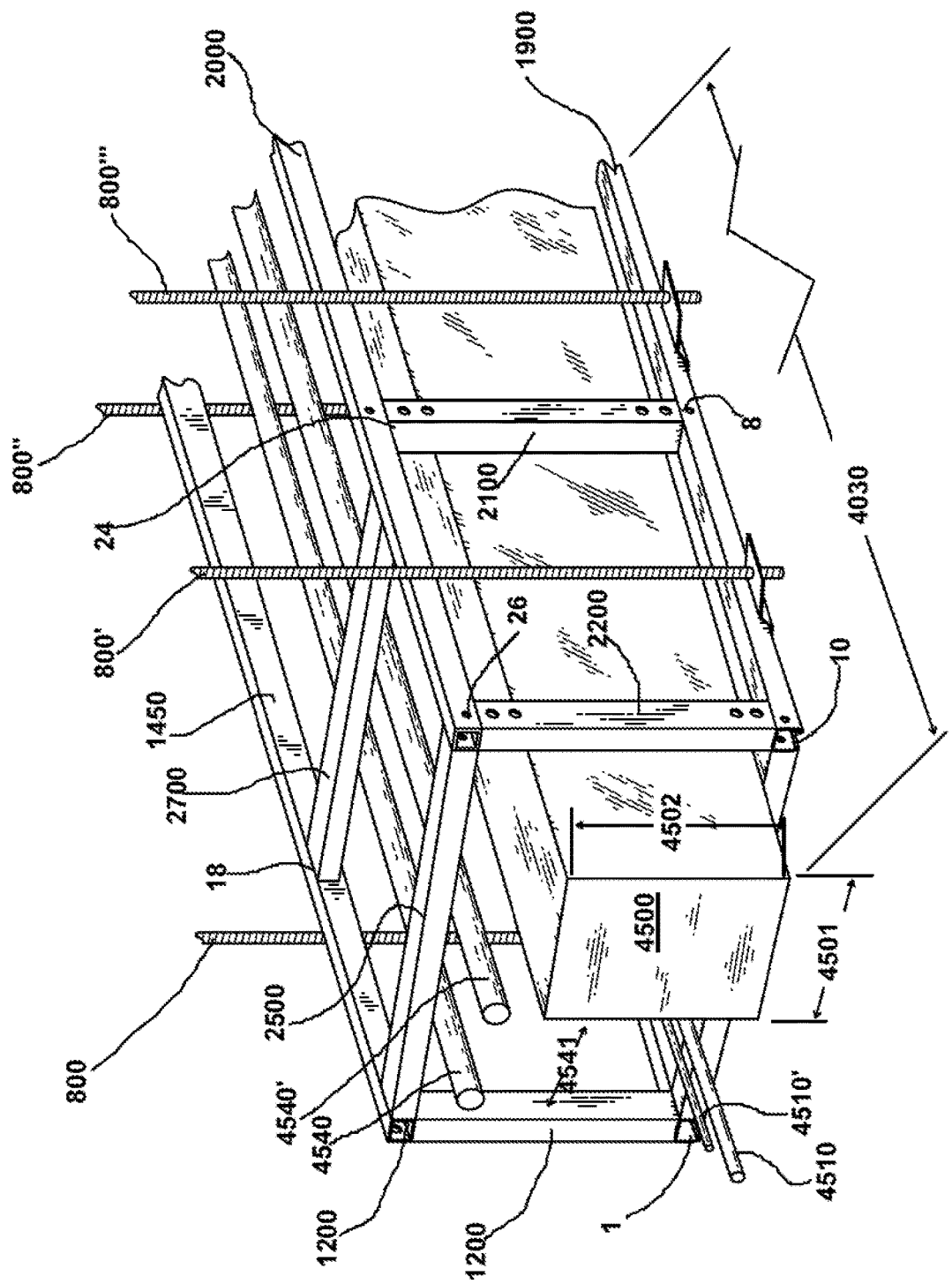
FIG. 16 is a perspective view of a multi level supporting frame assembled from a pre fabricated kit made by the method and apparatus, and which frame is now supporting a package (e.g., A/C ductwork and other items) in an elevated position.

Once assembled and supported by tensile members, support frame can support a load or package 4000. FIG. 16 is a perspective view of a multi level supporting frame 1000 assembled from a pre fabricated kit made by the method and apparatus 95, and which frame 1000 is now supporting a package 4000 (e.g., A/C ductwork 4500 and other items) in an elevated position. In FIG. 16 is shows ductwork 4500 having a width 4501 and height 4502, fire sprinkler piping 4540, 4540' having a spacing 4541 and spacing from ductwork 4500, and mechanical piping 4510,4510' having a spacing from each other and spacing from ductwork 4500. The set of items to be supported by frame 1000 are in combination referred to as the package and the overall dimensions of the items making up package 400 and their spacing or location interior to frame 1000 can be provided to the method and apparatus to assist in creating the pre-fabricated kit.

Assembling Customized Supporting Frame from Pre-Fabricated Kit

Customized supporting frame 1000 can be assembled from the a plurality of cut to length linear beams or struts 100,100', 100", 100''', etc. having the same cross section (taken perpendicular to the longitudinal axis if each linear beam) and the same material composition—so that the only variation between beams or struts are their cut lengths 106 which lengths 106 are cut for a frame 1000 of the desired shape and dimensions. For example, a single stock metal for all beams or struts can be used to cut to the individual lengths 106 desired for each of the plurality of beams or struts to be used in fabricating frame 1000.

Based on particularized user input, a pre-fabrication kit 96 can be created by the method and apparatus 95 for assembling a customized supporting frame 1000 which is comprised of a plurality of linear beam or support pieces pre-cut to length by the method and apparatus 95. Various embodiments of assembled customized supporting frames 1000 are shown in FIGS. 13-15 and 17-19.

In various embodiments, based on data input from a user, the method and apparatus 95 can fabricate a pre-fabrication kit 96 for assembling a customized supporting frame 1000 which includes the step of the method and apparatus 95 determining the quantity of linear beams or support pieces, lengths, connection points, connection hole patterns for a plurality of pre cut to length beams or struts to be assembled in forming the customized supporting frame 1000.

In various embodiments, for each beam or strut contained in the pre-fab kit 96, the method and apparatus 95 can determine the number of connections and the location of each connection by each beam or strut in the kit which is to be connected to said particular beam or strut. In various embodiments, from a set of selectable connecting hole patterns, for each beam or strut contained in the kit 96 and for each connection location on said beam or strut, the method and apparatus 95 can determine the connection hole pattern at said connection location.

In various embodiments, based on input from a user, the method and apparatus 95 can determine the particular lengths of the (a) horizontal longitudinal beams or struts and (b) horizontal cross beams or struts. In various embodiments, based on input from a user, the method and apparatus 95 can calculate the quantity and connection location of possible one or more horizontal supporting cross beams or struts.

In various embodiments the pre-fabrication kit 96 can include identifying indicia on each of the beams or struts included in the pre-fab kit 96 along with instructions identifying which beams or struts in the kit 96 are to be connected to each of the other beams or struts in the kit 96.

In various embodiments each connection location on for the set of beams or struts in the pre-fab kit 96 can be given unique identifying indicia and said unique identifying indicia can be referred to in the instructions to instruct a user on selection of beams/struts from the kit 96 to match connection locations for other beams/struts in the kit 96.

Single Level Supporting Frame

Figure 17:
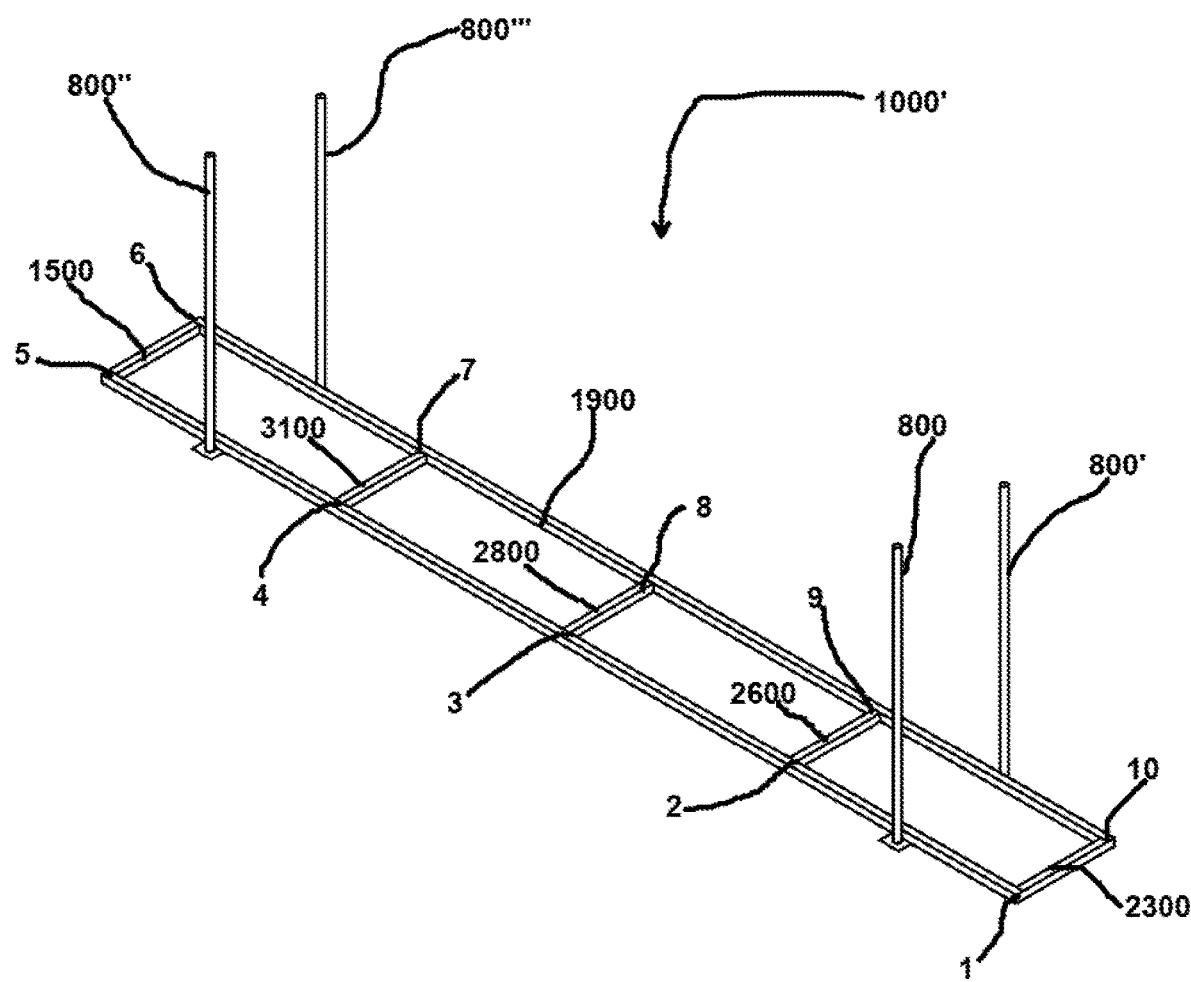
FIG. 17 is a perspective view of a single supporting frame assembled from a pre fabricated kit made by the method and apparatus, and which frame can support, in an elevated position, a package (e.g., A/C ductwork).
Figure 19:
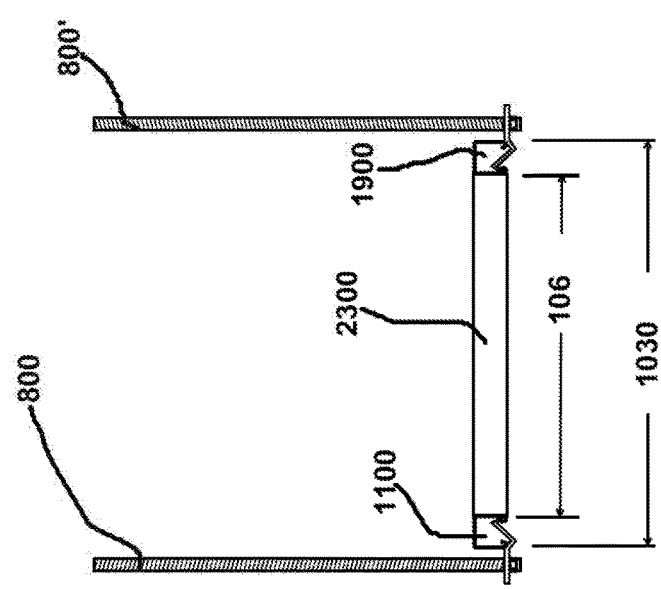
FIG. 19 is a side view of the supporting frame of FIG. 17.
Figure 18:
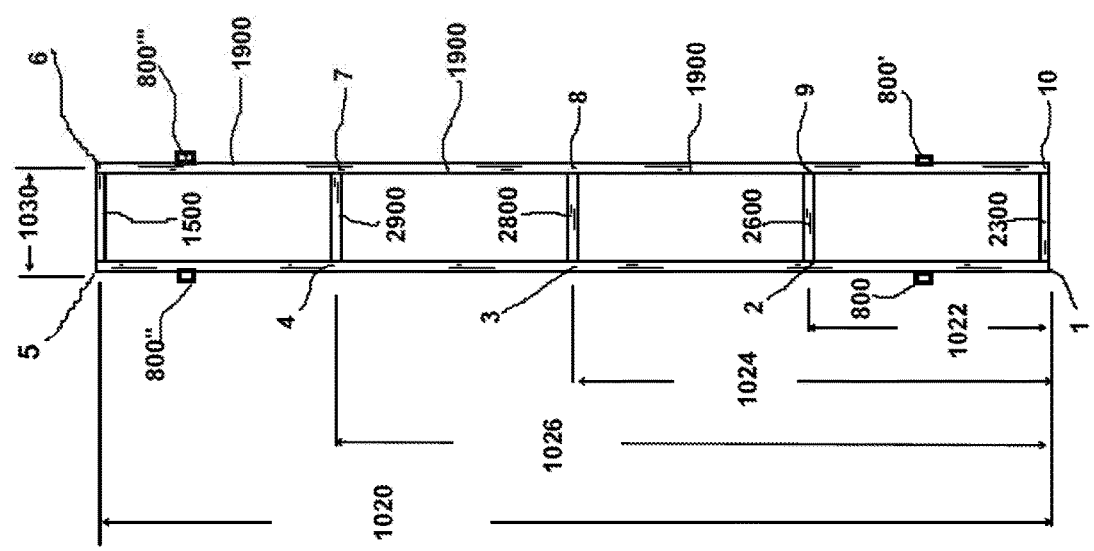
FIG. 18 is a top view of the supporting frame of FIG. 17.

FIG. 17 is a perspective view of a single supporting frame 1000 assembled from a pre fabricated kit 96 made by the method and apparatus 95, and which frame 1000 can support, in an elevated position, a package 4000 (e.g., A/C ductwork). FIG. 18 is a top view of the supporting frame 1000. FIG. 19 is a side view of the supporting frame 1000.

In various embodiments the customized supporting frame 1000 to be assembled from the pre-fab kit 96 created by the method and apparatus 95 is a single level supporting frame. In various embodiments, for a single level supporting frame 1000, the method and apparatus 95 can be used to create a pre-fabricated kit 96 for constructing a frame 1000, the pre-fabrication kit 96 including a plurality of pre-cut to lengths:

(a) perimeter horizontal longitudinal beams or struts;
(b) perimeter horizontal cross beams or struts; and
(c) possible one or more interior horizontal supporting cross beams or struts.

In various embodiments, based on input from a user, the method and apparatus 95 can calculate cut lengths for the:
(a) perimeter horizontal longitudinal beams or struts; and (b) perimeter horizontal cross beams or struts.

In various embodiments, the method and apparatus 95 can determine the quantity and connection locations of possible additional one or more interior horizontal supporting cross beams or struts, and calculate the cut lengths for these possible additional one or more interior horizontal supporting cross beams or struts.

The method and apparatus 95 can require a user to input a set of design parameters which set can include one or more of the following data parameters:

(a) overall perimeter of customized frame 1000 such as length 1020, width 1030, and height 1040;
(b) exterior dimensions of supported package 4000;
(c) minimum desired clearance between package 4000 supporting frame 1000 interior; and
(d) weight of supported package 4000.

From the inputted design parameters, method and apparatus 95 can calculate initial dimensions of length 1020 by width 1030 by height 1040 to satisfy parameter input.

In various embodiments package 4000 can be comprised of multiple items which are to be supported by supporting frame 1000. In various embodiments package 4000 can be include one or more items selected from the group consisting of: (a) ductwork, (b) mechanical piping (e.g., heating or cooling fluids); (c) domestic piping (e.g., for potable water); (d) medical gas piping; (e) fire sprinkler piping; (f) electrical conduit; and (g) communications cable trays.

In various embodiments the method and apparatus 95 can include a predesignated minimum design parameter value for one or more of the possible user input parameters. For example, in various embodiments the method and apparatus 95 can require a minimum clearance of at least 5 inches clearance between package 4000 supporting frame 1000 interior, the method and apparatus will automatically input said minimum parameter if a user either does not input data for said parameter or inputs a smaller number than the minimum. In other embodiments the method and apparatus can issue an alarm if a minimum parameter is violated by one or more user inputted parameters. In other embodiments the method and apparatus can require a minimum clearance between items comprising the package 4000 where multiple items comprise the package. For example, a minimum of 4 inches may be required between a duct and electrical conduit and a minimum clearance of 2 inches from the electrical conduit to the supporting frame.

In various embodiments the method and apparatus 95 can compare one or more of the user inputted parameters and determine if one or more user inputted parameters conflicts with one or more other user inputted parameters, and issue an alarm if a conflict condition is determined.

For example, a user may input one or more perimeter dimensions for the supporting frame 1000 that are smaller than one or more of the inputted dimensions for the supported package 4000 (or smaller than the one or more of the inputted dimensions for the package 4000 to be supported plus the inputted clearance amount). In such a conflict case, the method and apparatus 95 can issue an alarm.

In various embodiments the method and apparatus 95 can, after determining said conflicting condition, issue an alarm, display to a user the conflicting inputted parameters, and request newly input parameters to resolve the conflict. In various embodiments the method and apparatus 95 can automatically calculated and display suggested new input values for one or more of the conflicting input parameters. For example, in various embodiments the method and apparatus 95, when faced with the input for exterior dimensions that fail to satisfy the minimum clearance inputted, can issue a warning and alternative possible exterior dimensions that will satisfy the minimum clearance required.

Depending on specified loading, dimensional size, and strength requirements for customized frame 1000, the quantity and placement locations for reinforcing horizontal cross beams or struts can be determined by the method and apparatus 95 for providing a desired factor of safety for fabricated frame 1000 in handing the loading, size, and strength requirements. It is anticipated that a person of ordinary skill in the art can determine the number and locations for placement of horizontal reinforcing cross members.

Depending on the particular type of connection a particular opening hole connection pattern.

Individual Connection Joints/Configurations/Holes Patterns for Single Level Supporting Frame 1000

At connection 1, beams 1100 and 2300 are connected. Beam 1100 is horizontally positioned with its web 130 vertically upward (open interior 170 facing downwards) and has a type 940 opening pattern (FIG. 9). Beam 2300 is perpendicular to beam 1100, and also horizontally positioned but with its web 130 vertically downward (open interior 170 facing upwards) and has a type 900 opening pattern (FIG. 7), and has a bracket 500" in its interior 170 facing this connection point 1. This connection can be seen in FIG. 11 with beam 100" removed from the connection.

At connection 2, beams 1100 and 2600 are connected. Beam 1100 is horizontally positioned with its web 130 vertically upward and has a type 980 opening pattern (FIG. 10). Beam 2600 is perpendicular to beam 1100 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 3, beams 1100 and 2800 are connected. Beam 1100 is horizontally positioned with its web 130 vertically upward and has a type 940 opening pattern (FIG. 9). Beam 2800 is perpendicular to beam 1100, and also horizontally positioned but with its web 130 vertically downward and has a type 900 opening pattern (FIG. 7), and has a bracket 500" in its interior 170 facing this connection point 1. This connection can be seen in FIG. 11 with beam 100" removed from the connection.

At connection 4, beams 1100 and 3100 are connected. Beam 1100 is horizontally positioned with its web 130 vertically upward and has a type 980 opening pattern (FIG. 10). Beam 3100 is perpendicular to beam 1100 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 5, beams 1100 and 1500 are connected. Beam 1100 is horizontally positioned with its web 130 vertically upward and has a type 940 opening pattern (FIG. 9). Beam 1500 is perpendicular to beam 1100, and also horizontally positioned but with its web 130 vertically downward and has a type 900 opening pattern (FIG. 7), and has a bracket 500" in its interior 170 facing this connection point 1. This connection can be seen in FIG. 11 with beam 100" removed from the connection.

At connection 6, beams 1500 and 1900 are connected. Beam 1900 is horizontally positioned with its web 130 vertically upward and has a type 940 opening pattern (FIG. 9). Beam 1500 is perpendicular to beam 1900, and also horizontally positioned but with its web 130 vertically downward and has a type 900 opening pattern (FIG. 7), and has a bracket 500" in its interior 170 facing this connection point 1. This connection can be seen in FIG. 11 with beam 100" removed from the connection.

At connection 7, beams 1900 and 3100 are connected. Beam 1900 is horizontally positioned with its web 130 vertically upward and has a type 980 opening pattern (FIG. 10). Beam 3100 is perpendicular to beam 1900 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 8, beams 1900 and 2800 are connected. Beam 1900 is horizontally positioned with its web 130 vertically upward and has a type 940 opening pattern (FIG. 9). Beam 2800 is perpendicular to beam 1900, and also horizontally positioned but with its web 130 vertically downward and has a type 900 opening pattern (FIG. 7), and has a bracket 500" in its interior 170 facing this connection point 1. This connection can be seen in FIG. 11 with beam 100" removed from the connection.

At connection 9, beams 1900 and 2600 are connected. Beam 1900 is horizontally positioned with its web 130 vertically upward and has a type 980 opening pattern (FIG. 10). Beam 2600 is perpendicular to beam 1900 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 10, beams 1900 and 2300 are connected. Beam 1900 is horizontally positioned with its web 130 vertically upward and has a type 940 opening pattern (FIG. 9). Beam 2300 is perpendicular to beam 1900, and also horizontally positioned but with its web 130 vertically downward and has a type 900 opening pattern (FIG. 7), and has a bracket 500" in its interior 170 facing this connection point 1. This connection can be seen in FIG. 11 with beam 100" removed from the connection.

Multiple Level Supporting Frame

In various embodiments the pre-fab kit 96 can include a plurality of pre-cut to length beams or struts 100, 100', 100", etc. which can be assembled to form completed frame 1000 having a cuboid shape with dimensions of length 1020 by width 1030 by height 1040. With a cuboid supporting frame 1000, the frame will include rectangular faces on its exterior. FIGS. 13-15 show one embodiment of a customized supporting frame 1000.

In various embodiments the customized supporting frame 1000 to be assembled from the pre-fab kit 96 created by the method and apparatus 95 can be a multi-level supporting frame 1000, the pre-fabricated kit 96 including a plurality of pre-cut to lengths:

(a) bottom level perimeter horizontal longitudinal beams or struts;

(b) bottom level perimeter horizontal cross beams or struts;

(c) top level perimeter horizontal longitudinal beams or struts;

(d) top level perimeter horizontal cross beams or struts;

(e) possible one or more interior horizontal supporting cross beams or struts for the bottom and/or top levels;

(f) possible one or more supporting perimeter longitudinal cross beams or struts for connection between the top and bottom levels; and (g) possible one or more non-perimeter vertical supporting beams or struts.

In various embodiments, based on input from a user, the method and apparatus 95 can calculate cut lengths for the (a) perimeter horizontal longitudinal beams or struts and (b) perimeter horizontal cross beams or struts.

In various embodiments, the method and apparatus 95 can decide on the quantity, connection location, and cut lengths of the possible one or more supporting beams or struts falling within subparts (e), (f), (g), and (h) above.

In various embodiments plurality of beams or struts in pre-fab kit 96 can be assembled to form completed multi level frame 1000 having a cuboid shape (and including rectangular exterior faces of the cuboid) with dimensions of length 1020 by width 1030 by height 1040.

The method and apparatus 95 can require a user to input a set of design parameters which set can include one or more of the following data parameters:

(a) overall perimeter of customized frame 1000 such as length 1020, width 1030, and height 1040;

(b) exterior dimensions of supported package 4000 (e.g., width 4010, height 4020, an length 4030 as shown in FIG. 16);

(c) minimum desired clearance between package 4000 supporting frame 1000 interior; and (d) weight of supported package 4000.

From the inputted design parameters, method and apparatus 95 can calculate initial dimensions of length 1020 by width 1030 by height 1040 to satisfy parameter input.

In various embodiments the method and apparatus 95 can include a predesignated minimum design parameter value for one or more of the possible user input parameters. For example, in various embodiments the method and apparatus 95 can require a minimum clearance of at least 5 inches clearance between package 4000 supporting frame 1000 interior, the method and apparatus will automatically input said minimum parameter if a user either does not input data for said parameter or inputs a smaller number than the minimum. In other embodiments the method and apparatus can issue an alarm if a minimum parameter is violated by one or more user inputted parameters.

In various embodiments the method and apparatus 95 can compare one or more of the user inputted parameters and determine if one or more user inputted parameters conflicts with one or more other user inputted parameters, and issue an alarm if a conflict condition is determined.

For example, a user may input one or more perimeter dimensions for the supporting frame 1000 that are smaller than one or more of the inputted dimensions for the supported package 4000 (or smaller than the one or more of the inputted dimensions for the package 4000 to be supported plus the inputted clearance amount). In such a conflict case, the method and apparatus 95 can issue an alarm.

Depending on specified loading, dimensional size, and strength requirements for fabricated frame 1000, the quantity and placement locations for reinforcing horizontal cross beams or struts can be automatically determined by the method and apparatus for providing a desired factor of safety for fabricated frame 1000 when handing the loading, size, and strength requirements. It is anticipated that a person of ordinary skill in the art can determine the number and locations for placement of horizontal reinforcing cross members.

Depending on specified loading, dimensional size, and strength requirements for fabricated frame 1000, the quantity and placement locations for reinforcing vertical beams or struts can be automatically determined by the method and apparatus for providing a desired factor of safety for fabricated frame 1000 when handing the loading, size, and strength requirements. It is anticipated that a person of ordinary skill in the art can determine the number and locations for placement of vertical reinforcing cross members.

In various embodiments, the method and apparatus 95 can decide on the quantity, connection location, and cut lengths of the possible one or more supporting beams or struts falling within subparts (e), (f), and (g) above. In these embodiments where the method and apparatus 95 decides that additional supporting members are needed to satisfy strength and/or load bearing considerations, the method and apparatus 95 can also take into account the loss of interior space in multi level structure 1000 to handle supported package 4000. For example horizontal supporting cross member 2900 may be added at a level intermediate of top and bottom. This new lower member 2900 restricts the vertical height of supported package that can be accommodated. In this case the method and apparatus can determine that the vertical height of vertical beams or supports (e.g., 1200, 1300, etc.) need to be increased to accommodate supported package 4000, and then method and apparatus 95 will review inputted parameter data to determiner if a conflict exists, and if so issue a warning regarding the conflict.

Depending on the particular type of connection a particular opening hole connection pattern.

Multi Level Customized Support Frame

Lower planar face of frame 1000 can be formed by main longitudinal beams or struts 1100, 1900 with perpendicular beams or struts 2300 and 1500.

Upper planar face of frame 1000 can be formed by main longitudinal beams or struts 1450, 2000 with perpendicular cross beams or struts 2500 and 1700.

Upper and lower planar faces can be spaced apart by vertical beams or struts 1200, 1300, 1400, 1800, 2100, and 2200.

Overall length 1020 of frame 1000 is controlled by the longitudinal lengths 106 of the main longitudinal beams or struts 1100, 1450, 1900, 2000 (these longitudinal lengths 106 for the four main longitudinal beams 1100,1450,1900,2000 are assumed to be the same length 106).

Because perpendicular cross beams or struts 2300 and 1500 space apart main longitudinal beams or struts 1100, 1900 (and perpendicular cross beams or struts 2500 and 1700 space apart main longitudinal beams or struts 1100, 1900), width 1030 is calculated by adding the lengths 106 of either cross beam or strut 1500, 1700, 2300, or 2500 (these cross beams are assumed to have the same length 106) together with two of the exterior widths 178 of main longitudinal beams or struts 1100,1450, 1900, and 2000 (the exterior widths 178 of each of these main longitudinal beams or struts are assumed to be the same).

Because vertical beams or struts 1200, 1400, 1800, and 2200 space apart main longitudinal beams or struts 1100, 1450, 1900, and 2000, height 1040 of frame 1000 is calculated by adding the single length 106 for one of these vertical beams or struts 1200, 1400, 1800, and 2200 (these vertical beams or struts are assumed to have the same vertical length 106) together with the heights 172 for the respectively vertically spaced apart main longitudinal beams or struts 1100, 1450, 1900, and 2000 (the heights 172 for these main longitudinal beams or struts are assumed to be the same).

Main longitudinal beams or struts 1100, 1450, 1900, and 2000 all have their open interiors 170 facing downwardly.

Upper cross bracing beams or struts 1600, 1700, 2400, 2500, 2700, 2900, 3000, and 3200 all have their open interiors 170 facing downwardly.

Lower cross bracing beams or struts 1500, 2300, 2600, 2800, and 3100 all have their open interiors 170 facing upwardly.

Vertical beams or struts 1200, 1300, 1400, 1800, 2100, and 2200 all have their open interiors 170 facing sidwardly towards the opposing vertical beam or strut (beam 1200 being opposed to beam 2200, beam 1300 being opposed to beam 2100, and beam 1400 being opposed to beam 1800).

Individual Connection Joints/Configurations/Holes Patterns for Multi Level Frame 1000

The individual struts and connections of frame 1000 will be described below.

At connection 1, beams 1100, 1200, and 2300 are connected. Beam 1100 is horizontally positioned with its web 130 vertically upward (open interior 170 facing downwards) and has a type 940 opening pattern (FIG. 9). Beam 2300 is perpendicular to beam 1100, and also horizontally positioned but with its web 130 vertically downward (open interior 170 facing upwards) and has a type 900 opening pattern (FIG. 7), and has a bracket 500" in its interior 170 facing this connection point 1. Beam 1200 is perpendicular to beams 1100 and 2300 with its web 130 pointing outwardly from the frame 1000 (and its open interior 170 facing sideways towards the interior of frame 1000), and has a type 900 opening pattern (FIG. 7), and has a bracket 500' in its interior 170 facing this connection point 1. FIG. 11 provides an example of a three beam type connection, but with the connection point moved away from the first end 110 of beam 100.

At connection 2, beams 1100 and 2600 are connected. Beam 1100 is horizontally positioned with its web 130 vertically upward and has a type 980 opening pattern (FIG. 10). Beam 2600 is perpendicular to beam 1100 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 3, beams 1100, 1300, and 2800 are connected. Beam 1100 is horizontally positioned with its web 130 vertically upward and has a type 940 opening pattern (FIG. 9). Beam 2800 is perpendicular to beam 1100, and also horizontally positioned but with its web 130 vertically downward and has a type 900 opening pattern (FIG. 7), and has a bracket 500" in its interior 170 facing this connection point 1. Beam 1300 is perpendicular to beams 1100 and 2800 with its web 130 pointing outwardly from the frame 1000, and has a type 900 opening pattern (FIG. 7), and has a bracket 500' in its interior 170 facing this connection point 1. FIG. 11 provides an example of a three beam type connection.

At connection 4, beams 1100 and 3100 are connected. Beam 1100 is horizontally positioned with its web 130 vertically upward and has a type 980 opening pattern (FIG. 10). Beam 3100 is perpendicular to beam 1100 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 5, beams 1100, 1500, and 1400 are connected. Beam 1100 is horizontally positioned with its web 130 vertically upward and has a type 940 opening pattern (FIG. 9). Beam 1500 is perpendicular to beam 1100, and also horizontally positioned but with its web 130 vertically downward and has a type 900 opening pattern (FIG. 7), and has a bracket 500" in its interior 170 facing this connection point 1. Beam 1400 is perpendicular to beams 1100 and 1500 with its web 130 pointing outwardly from the frame 1000, and has a type 900 opening pattern (FIG. 7), and has a bracket 500' in its interior 170 facing this connection point 1. FIG. 11 provides an example of a three beam type connection, but with the connection point moved away from the first end 110 of beam 100.

At connection 6, beams 1900, 1500, and 1800 are connected. Beam 1900 is horizontally positioned with its web 130 vertically upward and has a type 940 opening pattern (FIG. 9). Beam 1500 is perpendicular to beam 1900, and also horizontally positioned but with its web 130 vertically downward and has a type 900 opening pattern (FIG. 7), and has a bracket 500" in its interior 170 facing this connection point 1. Beam 1800 is perpendicular to beams 1900 and 1500 with its web 130 pointing outwardly from the frame 1000, and has a type 900 opening pattern (FIG. 7), and has a bracket 500' in its interior 170 facing this connection point 1. FIG. 11 provides an example of a three beam type connection, but with the connection point moved away from the first end 110 of beam 100.

At connection 7, beams 1900 and 3100 are connected. Beam 1900 is horizontally positioned with its web 130 vertically upward and has a type 980 opening pattern (FIG. 10). Beam 3100 is perpendicular to beam 1900 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 8, beams 1900, 2100, and 2800 are connected. Beam 1900 is horizontally positioned with its web 130 vertically upward and has a type 940 opening pattern (FIG. 9). Beam 2800 is perpendicular to beam 1900, and also horizontally positioned but with its web 130 vertically downward and has a type 900 opening pattern (FIG. 7), and has a bracket 500" in its interior 170 facing this connection point 1. Beam 2100 is perpendicular to beams 1900 and

2800 with its web 130 pointing outwardly from the frame 1000, and has a type 900 opening pattern (FIG. 7), and has a bracket 500' in its interior 170 facing this connection point 1. FIG. 11 provides an example of a three beam type connection.

At connection 9, beams 1900 and 2600 are connected. Beam 1900 is horizontally positioned with its web 130 vertically upward and has a type 980 opening pattern (FIG. 10). Beam 2600 is perpendicular to beam 1900 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 10, beams 1900, 2200, and 2300 are connected. Beam 1900 is horizontally positioned with its web 130 vertically upward and has a type 940 opening pattern (FIG. 9). Beam 2300 is perpendicular to beam 1900, and also horizontally positioned but with its web 130 vertically downward and has a type 900 opening pattern (FIG. 7), and has a bracket 500" in its interior 170 facing this connection point 1. Beam 2200 is perpendicular to beams 1900 and 2300 with its web 130 pointing outwardly from the frame 1000, and has a type 900 opening pattern (FIG. 7), and has a bracket 500' in its interior 170 facing this connection point 1. FIG. 11 provides an example of a three beam type connection, but with the connection point moved away from the first end 110 of beam 100.

At connection 11, beams 1200 and 2400 are connected. Beam 2400 is horizontally positioned with its web 130 vertically upward and has a type 980 opening pattern (FIG. 10). Beam 1200 is perpendicular to beam 2400 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 12, beams 1300 and 2900 are connected. Beam 2900 is horizontally positioned with its web 130 vertically upward and has a type 980 opening pattern (FIG. 10). Beam 1300 is perpendicular to beam 2900 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 13, beams 1400 and 1600 are connected. Beam 1600 is horizontally positioned with its web 130 vertically upward and has a type 980 opening pattern (FIG. 10). Beam 1400 is perpendicular to beam 1600 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 14, beams 1600 and 1800 are connected. Beam 1600 is horizontally positioned with its web 130 vertically upward and has a type 980 opening pattern (FIG. 10). Beam 1800 is perpendicular to beam 1600 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 15, beams 2100 and 2900 are connected. Beam 2900 is horizontally positioned with its web 130 vertically upward and has a type 980 opening pattern (FIG. 10). Beam 2100 is perpendicular to beam 2900 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 16, beams 2200 and 2400 are connected. Beam 2400 is horizontally positioned with its web 130 vertically upward and has a type 980 opening pattern (FIG. 10). Beam 2200 is perpendicular to beam 2400 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 17, beams 1450, 1200, and 2500 are connected. Beam 1450 is horizontally positioned with its web 130 vertically upward and has a type 940 opening pattern (FIG. 9). Beam 2500 is perpendicular to beam 1450, and also horizontally positioned but with its web 130 vertically downward and has a type 900 opening pattern (FIG. 7), and has a bracket 500" in its interior 170 facing this connection point 1. Beam 1200 is perpendicular to beams 1450 and 2500 with its web 130 pointing outwardly from the frame 1000, and has a type 900 opening pattern (FIG. 7), and has a bracket 500' in its interior 170 facing this connection point 1. FIG. 11 provides an example of a three beam type connection, but with the connection point moved away from the first end 110 of beam 100.

At connection 18, beams 1450 and 2700 are connected. Beam 1450 is horizontally positioned with its web 130 vertically upward and has a type 980 opening pattern (FIG. 10). Beam 2700 is perpendicular to beam 1450 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 19, beams 1450, 1300, and 3000 are connected. Beam 1450 is horizontally positioned with its web 130 vertically upward and has a type 940 opening pattern (FIG. 9). Beam 3000 is perpendicular to beam 1450, and also horizontally positioned but with its web 130 vertically downward and has a type 900 opening pattern (FIG. 7), and has a bracket 500" in its interior 170 facing this connection point 1. Beam 1300 is perpendicular to beams 1450 and 3000 with its web 130 pointing outwardly from the frame 1000, and has a type 900 opening pattern (FIG. 7), and has a bracket 500' in its interior 170 facing this connection point 1. FIG. 11 provides an example of a three beam type connection.

At connection 20, beams 1450 and 3200 are connected. Beam 1450 is horizontally positioned with its web 130 vertically upward and has a type 980 opening pattern (FIG. 10). Beam 3200 is perpendicular to beam 1450 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 21, beams 1400, 1450, and 1700 are connected. Beam 1450 is horizontally positioned with its web 130 vertically upward and has a type 940 opening pattern (FIG. 9). Beam 1700 is perpendicular to beam 1450, and also horizontally positioned but with its web 130 vertically downward and has a type 900 opening pattern (FIG. 7), and has a bracket 500" in its interior 170 facing this connection point 1. Beam 1400 is perpendicular to beams 1450 and 1700 with its web 130 pointing outwardly from the frame 1000, and has a type 900 opening pattern (FIG. 7), and has a bracket 500' in its interior 170 facing this connection point 1. FIG. 11 provides an example of a three beam type connection, but with the connection point moved away from the first end 110 of beam 100.

At connection 22 beams 1700, 1800, and 3000 are connected. Beam 2000 is horizontally positioned with its web 130 vertically upward and has a type 940 opening pattern (FIG. 9). Beam 1700 is perpendicular to beam 2000, and also horizontally positioned but with its web 130 vertically upward and has a type 900 opening pattern (FIG. 7), and has a bracket 500" in its interior 170 facing this connection point 1. Beam 1800 is perpendicular to beams 1700 and 3000 with its web 130 pointing outwardly from the frame 1000, and has a type 900 opening pattern (FIG. 7), and has a bracket 500' in its interior 170 facing this connection point 1. FIG. 11 provides an example of a three beam type connection, but with the connection point moved away from the first end 110 of beam 100.

At connection 23, beams 2000 and 3200 are connected. Beam 2000 is horizontally positioned with its web 130 vertically upward and has a type 980 opening pattern (FIG. 10). Beam 3200 is perpendicular to beam 2000 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 24, beams 2000, 2100, and 3000 are connected. Beam 2000 is horizontally positioned with its web 130 vertically upward and has a type 940 opening pattern (FIG. 9). Beam 3000 is perpendicular to beam 2000, and also horizontally positioned but with its web 130 vertically downward and has a type 900 opening pattern (FIG. 7), and has a bracket 500" in its interior 170 facing this connection point 1. Beam 2100 is perpendicular to beams 2000 and 3000 with its web 130 pointing outwardly from the frame 1000, and has a type 900 opening pattern (FIG. 7), and has a bracket 500' in its interior 170 facing this connection point 1. FIG. 11 provides an example of a three beam type connection.

At connection 25, beams 2000 and 2700 are connected. Beam 2000 is horizontally positioned with its web 130 vertically upward and has a type 980 opening pattern (FIG. 10). Beam 2700 is perpendicular to beam 2000 with its web 130 pointing outwardly from the frame 1000, and has a type 900 opening pattern (FIG. 7), and has a bracket 500' in its interior 170 facing this connection point 1. This connection can be seen in FIG. 11 with beam 100" removed from the connection.

At connection 26, beams 2000, 2200, and 2500 are connected. Beam 2000 is horizontally positioned with its web 130 vertically upward and has a type 940 opening pattern (FIG. 9). Beam 2500 is perpendicular to beam 2000, and also horizontally positioned but with its web 130 vertically downward and has a type 900 opening pattern (FIG. 7), and has a bracket 500" in its interior 170 facing this connection point 1. Beam 2200 is perpendicular to beams 2000 and 2500 with its web 130 pointing outwardly from the frame 1000, and has a type 900 opening pattern (FIG. 7), and has a bracket 500' in its interior 170 facing this connection point 1. FIG. 11 provides an example of a three beam type connection, but with the connection point moved away from the first end 110 of beam 100.

The following is a list of reference numerals:

LIST FOR REFERENCE NUMERALS

| (Reference No.) | (Description) |
|---|---|
| 1 | connection |
| 2 | connection |
| 3 | connection |
| 4 | connection |
| 5 | connection |
| 6 | connection |
| 7 | connection |
| 8 | connection |
| 9 | connection |
| 10 | connection |
| 11 | connection |
| 12 | connection |
| 13 | connection |
| 14 | connection |
| 15 | connection |
| 16 | connection |
| 17 | connection |
| 18 | connection |
| 19 | connection |
| 20 | connection |
| 21 | connection |
| 22 | connection |
| 23 | connection |
| 24 | connection |
| 25 | connection |
| 26 | connection |
| 40 | screw driver |
| 41 | handle |
| 42 | shaft |
| 43 | tip |
| 50 | threaded fastener |
| 95 | method and apparatus |
| 96 | pre-fabrication kit |
| 100 | support beam |
| 101 | bottom |
| 102 | centerline |
| 106 | longitudinal length |
| 104 | arrow |
| 110 | first end |
| 120 | second end |
| 130 | web portion |
| 134 | first opening of first diameter on web |
| 135 | distance of first opening from first end |
| 136 | second opening of second diameter on web |
| 137 | distance of second opening from first end |
| 138 | spacing between first and second openings |
| 140 | first flange of C-section |
| 141 | socket |
| 142 | width of socket or curved section |
| 145 | first opening of first diameter on first flange |
| 146 | distance of first opening from first end of first flange |
| 147 | distance of first opening from bottom of first flange |
| 150 | second flange of C-section |
| 151 | socket |
| 152 | width of socket or curved section |
| 155 | first opening of first diameter in second flange |
| 156 | distance of first opening from first end of second flange |
| 157 | distance of first opening from bottom of second flange |
| 170 | interior |
| 172 | overall height of beam or support |
| 173 | height of interior of beam or support |
| 174 | width of interior of beam or support |
| 175 | overall width of exterior of beam or support |
| 178 | width of open section |
| 200 | arrow |
| 202 | arrow |
| 400 | support bracket |
| 404 | body |
| 406 | connector base |
| 407 | relative angle between web 130 and body of support bracket before threaded fasteners 50 are used to connect the two pieces |

-continued

LIST FOR REFERENCE NUMERALS

| (Reference No.) | (Description) |
|---|---|
| 410 | first end |
| 420 | second end |
| 430 | top |
| 432 | height |
| 433 | width |
| 434 | depth or length |
| 440 | bottom |
| 450 | planer face |
| 452 | planer bottom |
| 460 | height |
| 462 | width |
| 464 | depth or thickness |
| 500 | first threaded opening |
| 502 | dimension |
| 503 | dimension |
| 510 | second threaded opening |
| 512 | dimension |
| 513 | dimension |
| 514 | dimension |
| 520 | third threaded opening |
| 522 | dimension |
| 523 | dimension |
| 530 | spacing between second and third threaded openings |
| 700 | washer |
| 710 | first end |
| 720 | second end |
| 730 | top |
| 732 | height |
| 733 | width |
| 734 | depth or length |
| 740 | bottom |
| 750 | planer face |
| 760 | first opening |
| 780 | first recessed area |
| 790 | second recessed area |
| 900 | first opening pattern |
| 940 | second opening pattern |
| 980 | third opening pattern |
| 1000 | supporting frame |
| 1001 | face |
| 1002 | face |
| 1003 | face |
| 1004 | face |
| 1005 | face |
| 1005 | face |
| 1010 | plurality of supporting beams |
| 1020 | length |
| 1030 | width |
| 1040 | height |
| 1042 | sub height one |
| 1044 | sub height two |
| 1100 | beam |
| 1200 | beam |
| 1300 | beam |
| 1400 | beam |
| 1500 | beam |
| 1600 | beam |
| 1700 | beam |
| 1800 | beam |
| 1900 | beam |
| 2000 | beam |
| 2100 | beam |
| 2200 | beam |
| 2300 | beam |
| 2400 | beam |
| 2500 | beam |
| 2600 | beam |
| 2700 | beam |
| 2800 | beam |
| 2900 | beam |
| 3000 | beam |
| 3100 | beam |
| 3200 | beam |
| 4000 | package |
| 4010 | width |

-continued

LIST FOR REFERENCE NUMERALS

| (Reference No.) | (Description) |
|---|---|
| 4020 | height |
| 4030 | length |
| 4500 | ductwork |
| 4501 | width |
| 4502 | height |
| 4510 | mechanical piping (e.g., heating or cooling fluids) |
| 4520 | domestic piping (e.g., for potable water) |
| 4530 | medical gas piping |
| 4540 | fire sprinkler piping |
| 4541 | spacing |
| 4550 | electrical conduit |
| 4560 | communications cable trays |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A pre-fabricated kit for assembling a structural framework comprising:

(a) a plurality of a cut to length beams or struts where each beam or strut in the plurality of cut to length beams or struts;

includes a web, first and second beam flanges, first and second ends, a longitudinal centerline, and an interior defined by the beam's or strut's web, first and second beam flanges, and first and second ends; and each beam or strut in the plurality of cut to length beams or struts having a plurality of flange openings in each beam's or strut's first and second beam flanges wherein the flange openings are longitudinally aligned with each other along at least one line that is parallel to the longitudinal centerline of each particular beam or strut from the plurality of the cut to length beams or struts;

(b) a plurality of universal connector pieces, each of the universal connector pieces including
first and second perpendicular flanges
joined to each other at a joint, and
including openings in the first and second perpendicular flanges, and
each universal connector piece being insertable
into the interior of the selected beam or strut
from the plurality of cut to length beams or struts
wherein the inserted universal connector piece
being located entirely in the interior of the selected beam or strut
from the plurality of cut to length beams or struts and
such that the first perpendicular flange
being perpendicular to the longitudinal centerline of the selected beam or strut from the plurality of cut to length beams or struts and
being flush with the second end of the selected beam or strut from the plurality of cut to length beams or struts, and
the second perpendicular flange
being generally parallel to the longitudinal centerline of the selected beam or strut from the plurality of cut to length beams or struts;
(c) wherein a first beam or strut selected from the plurality of cut to length beams or struts having
a first universal connector piece from the plurality of universal connector pieces
being inserted into the interior of the first beam or strut,
wherein the first universal connector piece is connected to a second beam or strut
from the plurality of cut to length beams or struts,
via a fastener
passing through one of the openings in the second beam flange
of the second beam or strut, and the fastener
also passes through the opening of the first perpendicular flange
in the first universal connector piece
from the plurality of universal connector pieces
located in the first beam or strut, and
wherein the longitudinal centerline of the first beam or strut
being perpendicular to the longitudinal centerline of the second beam or strut wherein when the first and second beams or struts from the plurality of cut to length beams or struts are attached by the fastener, both the first and second beams or struts are rotatable relative to each other.

2. The structural framework assembled from the pre-fabricated kit of claim 1, further comprising:
(a) a plurality of bottom level perimeter horizontal longitudinal beams or struts;
(b) a plurality of bottom level perimeter horizontal cross beams or struts, wherein the plurality of bottom level perimeter horizontal longitudinal beams or struts and the plurality of bottom level perimeter horizontal cross beams or struts both include the first and second beams or struts, and form a bottom level;
(c) a plurality of top level perimeter horizontal longitudinal beams or struts;
(d) a plurality of top level perimeter horizontal cross beams or struts, wherein the top level perimeter horizontal longitudinal beams or struts and top level perimeter horizontal cross beams or struts form a top level;
(e) a plurality of interior horizontal supporting cross beams or struts connecting the plurality of bottom level perimeter horizontal longitudinal beams or struts or the plurality of top level horizontal longitudinal beams or struts;
(f) a plurality of supporting perimeter longitudinal cross beams or struts for connection between the top and bottom levels; and
(g) a plurality of non-perimeter vertical supporting beams or struts for connection of the plurality of bottom level perimeter horizontal cross beams or struts and the plurality of top level perimeter horizontal cross beams or struts.

3. The structural framework assembled from the pre-fabricated kit of claim 1, wherein, when the first and second beams or struts from the plurality of cut to length beams or struts are connected, a tool passes through the other of the openings in the first and second flanges of the second beam or strut and into the interior of the second beam or strut.

4. The structural framework assembled from the pre-fabricated kit of claim 1, wherein, when the first and second beams or struts from the plurality of cut to length beams or struts are connected, a tool must be inserted into the other of the openings in the first and second flanges of the second beam or strut to enter the interior of the second beam or strut.

5. A pre-fabricated kit for assembling a structural framework comprising:
(a) a plurality of a cut to length beams or struts
where each beam or strut in the plurality of cut to length beams or struts;
includes
a web,
first and second beam flanges,
first and second ends,
a longitudinal centerline, and
an interior defined by
the beam's or strut's
web,
first and second beam flanges, and
first and second ends; and
each beam or strut in the plurality of cut to length beams or struts having
a plurality of flange openings in each beam's or strut's first and second beam flanges
wherein the flange openings are
longitudinally aligned with each other
along at least one line that is parallel to the longitudinal centerline of
each particular beam or strut from the plurality of the cut to length beams or struts;
(b) a plurality of universal connector pieces, each of the universal connector pieces including
first and second perpendicular flanges
joined to each other at a joint, and
including openings in the first and second perpendicular flanges, and
each universal connector piece being insertable
into the interior of the selected beam or strut
from the plurality of cut to length beams or struts
wherein the inserted universal connector piece
being positionable such that it is located entirely in the interior of the selected beam or strut from the plurality of cut to length beams or struts and
such that the first perpendicular flange
being perpendicular to the longitudinal centerline of the selected beam or strut
from the plurality of cut to length beams or struts and
being flush with the second end of the selected beam or strut from the plurality of cut to length beams or struts, and the second perpendicular flange being generally parallel to the longitudinal centerline of the selected beam or strut from the plurality of cut to length beams or struts;

(c) wherein a first beam or strut selected from the plurality of cut to length beams or struts having a first universal connector piece from the plurality of universal connector pieces being inserted into the interior of the first beam or strut, wherein the first universal connector piece is connected to a second beam or strut from the plurality of cut to length beams or struts, via a fastener passing through one of the openings in the second beam flange of the second beam or strut, and the fastener also passes through the opening of the first perpendicular flange in the first universal connector piece from the plurality of universal connector pieces located in the first beam or strut, and wherein the longitudinal centerline of the first beam or strut being perpendicular to the longitudinal centerline of the second beam or strut wherein when the first and second beams or struts from the plurality of cut to length beams or struts are attached by the fastener, both the first and second beams or struts are rotatable relative to each other; and, wherein, before being finally positioned the first universal connector from the plurality of universal connectors is inserted into the interior of the first beam or strut from the plurality of cut to length beams or struts, the second perpendicular support flange of the first universal connector has an angle with the web of the first beam of strut that is between ½ and 5 degrees.

6. The structural framework assembled from the pre-fabricated kit of claim 1, wherein, the first and second beams or struts from the plurality of cut to length beams or struts each have a connector opening pattern for their respective plurality of flange openings selected from the set of connector opening patterns consisting of:

(a) first and second longitudinally aligned openings located on the flanges of their respective first and second beams or struts from the plurality of cut to length beams or struts; and (b) first and second longitudinally aligned openings located on the flanges of their respective first and second beams or struts from the plurality of cut to length beams or struts, along with a third longitudinally aligned opening located on the web of the first and second beams or struts from the plurality of cut to length beams or struts.

7. The structural framework assembled from the pre-fabricated kit of claim 1, wherein, a third beam or strut selected from the plurality of cut to length beams or struts having a second universal connector from the plurality of universal connectors which first perpendicular flange of the second universal connector is flush with the second end of the third beam or strut; wherein the longitudinal centerline of the selected third beam or strut being perpendicular to the longitudinal line of the selected first beam or strut, and also perpendicular to the longitudinal centerline of the selected second beam or strut.

8. A pre-fabricated kit for assembling a structural framework comprising:

(a) a plurality of a cut to length beams or struts where each beam or strut in the plurality of cut to length beams or struts;

includes a web, first and second beam flanges, first and second ends, a longitudinal centerline, and an interior defined by the beam's or strut's web, first and second beam flanges, and first and second ends; and each beam or strut in the plurality of cut to length beams or struts having a plurality of flange openings in each beam's or strut's first and second beam flanges wherein the flange openings are longitudinally aligned with each other along at least one line that is parallel to the longitudinal centerline of each particular beam or strut from the plurality of the cut to length beams or struts;

(b) a plurality of universal connector pieces, each of the universal connector pieces including first and second perpendicular flanges joined to each other at a joint, and including openings in the first and second perpendicular flanges, and each universal connector piece being insertable into the interior of the selected beam or strut from the plurality of cut to length beams or struts wherein the inserted universal connector piece being located entirely in the interior of the selected beam or strut from the plurality of cut to length beams or struts and such that the first perpendicular flange being perpendicular to the longitudinal centerline of the selected beam or strut from the plurality of cut to length beams or struts and being flush with the second end of the selected beam or strut from the plurality of cut to length beams or struts, and the second perpendicular flange being generally parallel to the longitudinal centerline of the selected beam or strut from the plurality of cut to length beams or struts;

(c) wherein a first beam or strut selected from the plurality of cut to length beams or struts having
a first universal connector piece from the plurality of universal connector pieces
being inserted into the interior of the first beam or strut, wherein the first universal connector piece is
connected to a second beam or strut
from the plurality of cut to length beams or struts,
via a fastener
passing through one of the openings in the second beam flange
of the second beam or strut, and the fastener
also passes through the opening of the first perpendicular flange
in the first universal connector piece
from the plurality of universal connector pieces
located in the first beam or strut, and
wherein the longitudinal centerline of the first beam or strut
being perpendicular to the longitudinal centerline of the second beam or strut wherein the first and second beam flanges of the first beam or strut each include a socket, and the first and second beam flanges of the second beam or strut each include a socket, and a first gaps exists between the sockets of the first beam or strut providing access to the interior of the first beam or strut, and a second gaps exists between the sockets of the second beam or strut providing access to the interior of the second beam or strut.

9. The structural framework assembled from the prefabricated kit of claim 1, wherein, a selected third beam or strut selected from the plurality of cut to length beams or struts having a web, first and second beam flanges with sockets, first and second ends, a longitudinal centerline, and an interior defined by the selected third beam's or strut's web, first and second beam flanges, and first and second ends, and a third gaps exists between the sockets of the third selected beam or strut providing access to the interior of the third selected beam or strut, and a washer which is slidable connected to the sockets of the third selected beam or strut; wherein the longitudinal centerline of the selected third beam or strut being perpendicular to the longitudinal line of the selected first beam or strut, and also perpendicular to the longitudinal centerline of the selected second beam or strut.

10. The structural framework assembled from the prefabricated kit of claim 1, wherein when the first and second beams or struts from the plurality of cut to length beams or struts are attached at their respective connection point, the first beam or strut having first and second ends, the second beam or strut having first and second ends, and the connection point is spaced apart from the first and second ends of both the first and second beams or struts.

11. The structural framework assembled from the prefabricated kit of claim 1, wherein when the first and second beams or struts from the plurality of cut to length beams or struts are attached at their respective connection point, the first beam or strut having first and second ends, either the first or second end of the first beam or strut blocking one of the plurality of longitudinally aligned flange openings of the second beam or strut.

\* \* \* \* \*